(12) United States Patent
Nagatoshi

(10) Patent No.: US 10,955,731 B2
(45) Date of Patent: Mar. 23, 2021

(54) IMAGING OPTICAL SYSTEM, PROJECTION DISPLAY DEVICE, AND IMAGING APPARATUS

(71) Applicant: FUJIFILM Corporation, Tokyo (JP)

(72) Inventor: Yukiko Nagatoshi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/578,548

(22) Filed: Sep. 23, 2019

(65) Prior Publication Data
US 2020/0096847 A1 Mar. 26, 2020

(30) Foreign Application Priority Data

Sep. 25, 2018 (JP) .............................. JP2018-179426
Feb. 7, 2019 (JP) .............................. JP2019-021042

(51) Int. Cl.
| G03B 21/14 | (2006.01) |
| G02B 15/20 | (2006.01) |
| G02B 15/14 | (2006.01) |
| G02B 13/16 | (2006.01) |

(52) U.S. Cl.
CPC .......... *G03B 21/142* (2013.01); *G02B 15/142* (2019.08); *G02B 15/20* (2013.01); *G02B 13/16* (2013.01)

(58) Field of Classification Search
CPC .... G03B 21/28; G03B 21/142; G03B 21/145; G03B 21/147; G02B 15/20; G02B 15/142; G02B 15/1421; G02B 15/1425; G02B 15/1431
See application file for complete search history.

(56) References Cited

U.S. PATENT DOCUMENTS

| 2015/0234167 A1* | 8/2015 | Ode .................... G02B 15/14 359/432 |
| 2015/0323770 A1* | 11/2015 | Sashima ............... G02B 13/18 359/683 |
| 2016/0246034 A1* | 8/2016 | Amano .............. G02B 13/0095 |
| 2018/0059389 A1* | 3/2018 | Inoue .................. G02B 15/163 |
| 2019/0361208 A1* | 11/2019 | Mori ....................... G02B 5/00 |

FOREIGN PATENT DOCUMENTS

JP 2015-152890 A 8/2015

* cited by examiner

*Primary Examiner* — Sultan Chowdhury
(74) *Attorney, Agent, or Firm* — Studebaker & Brackett PC

(57) ABSTRACT

An imaging optical system consists of a first lens group and a second lens group, in order from a magnification side along an optical axis, an intermediate image is formed between the first lens group and the second lens group on the optical axis, at least one of the first lens group or the second lens group includes a reflector that bends the optical axis, the second lens group includes a movable lens group that moves during zooming, and predetermined conditional expressions are satisfied.

12 Claims, 16 Drawing Sheets

EXAMPLE 1
WIDE-ANGLE END

EXAMPLE 2

WIDE-ANGLE END

EXAMPLE 4 (MODIFICATIN EXAMPLE)

WIDE-ANGLE END

FIG. 9
EXAMPLE 1
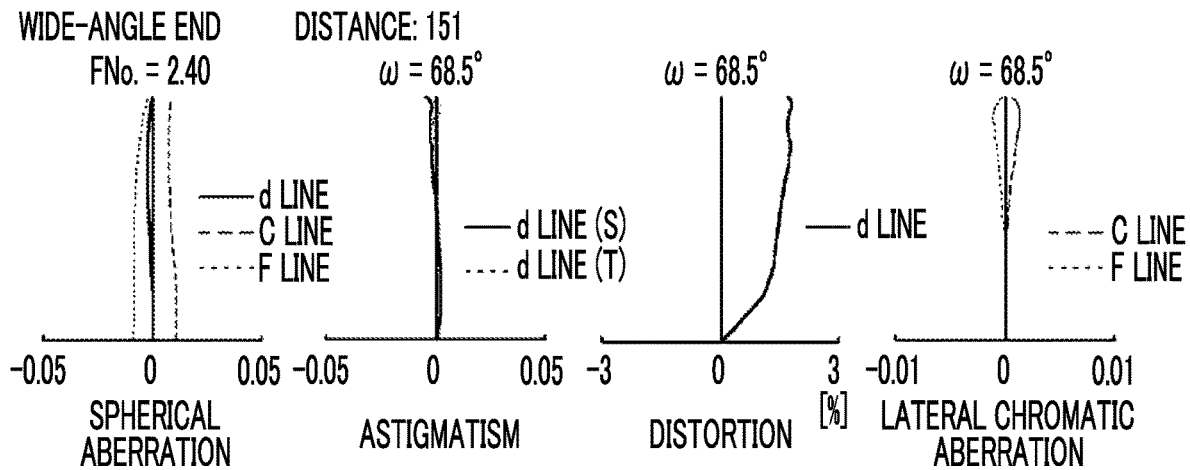
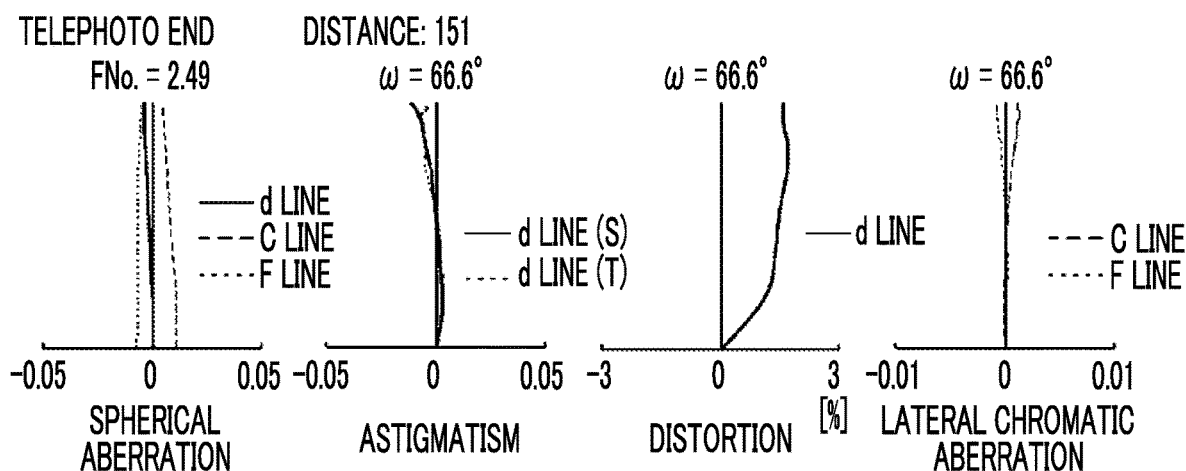
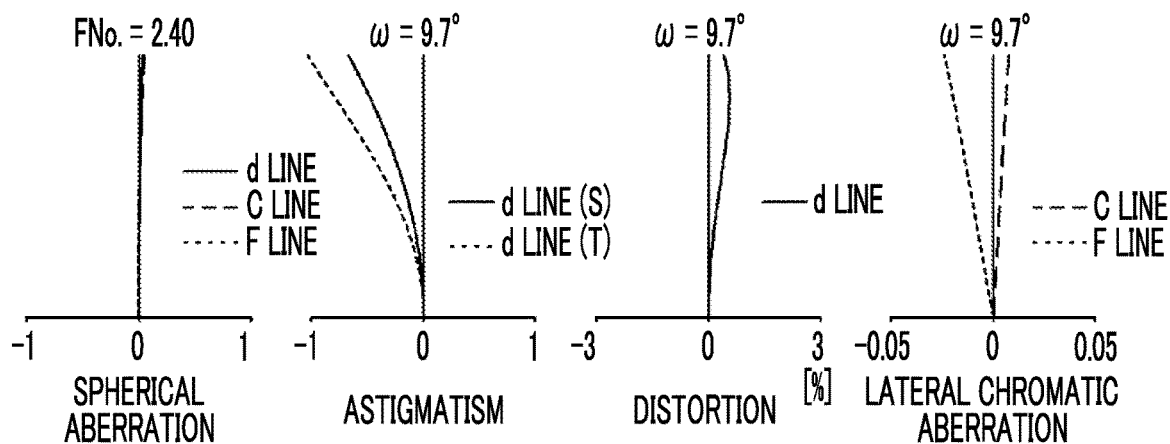

FIG. 10
EXAMPLE 2
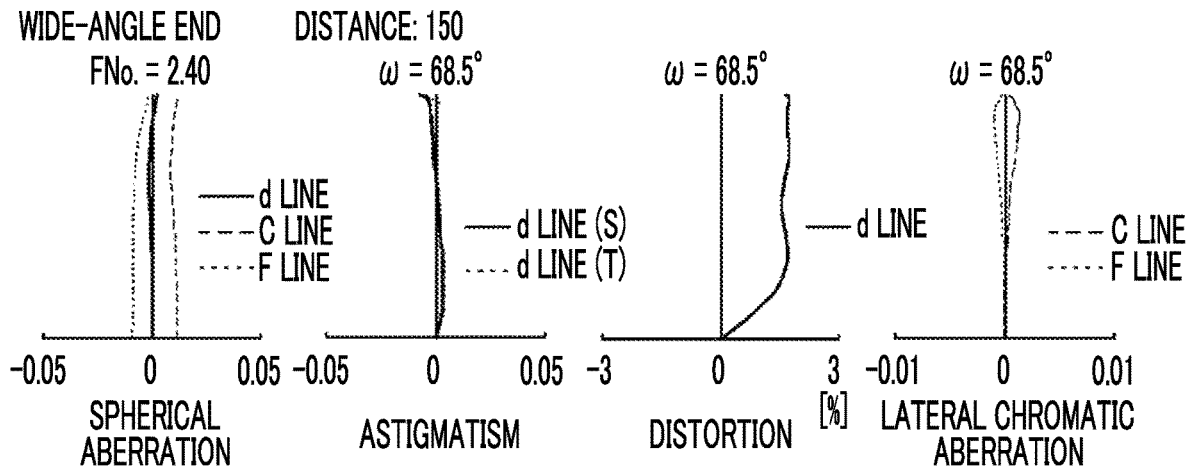
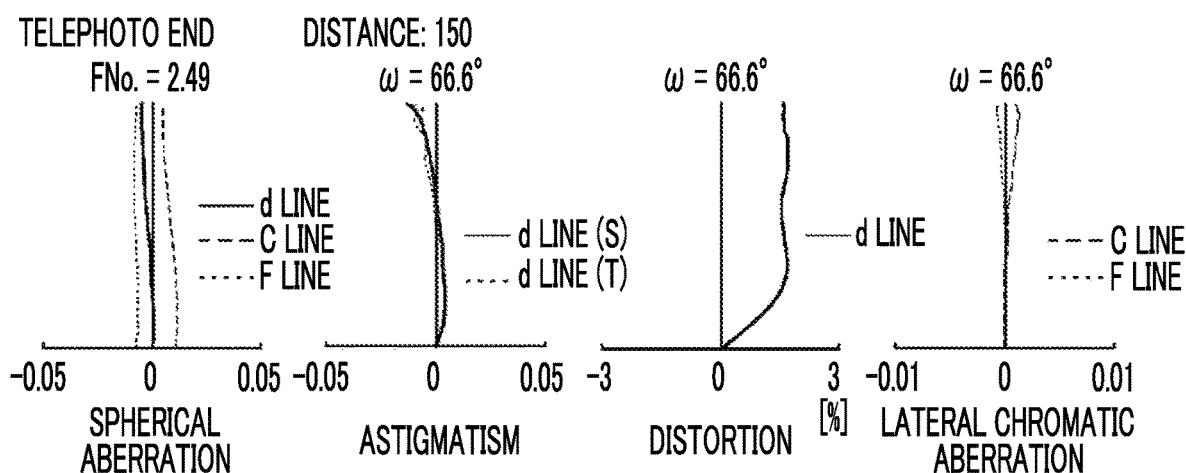
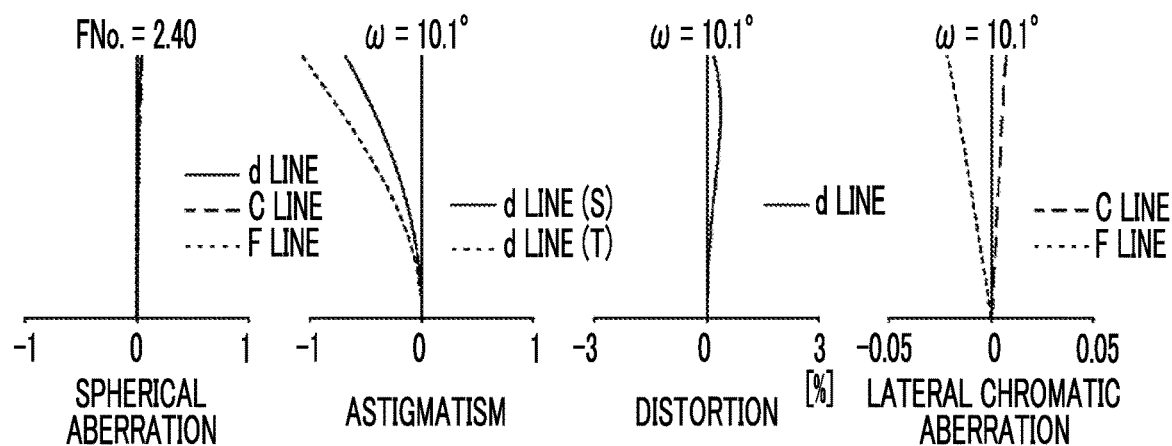

FIG. 11
EXAMPLE 3
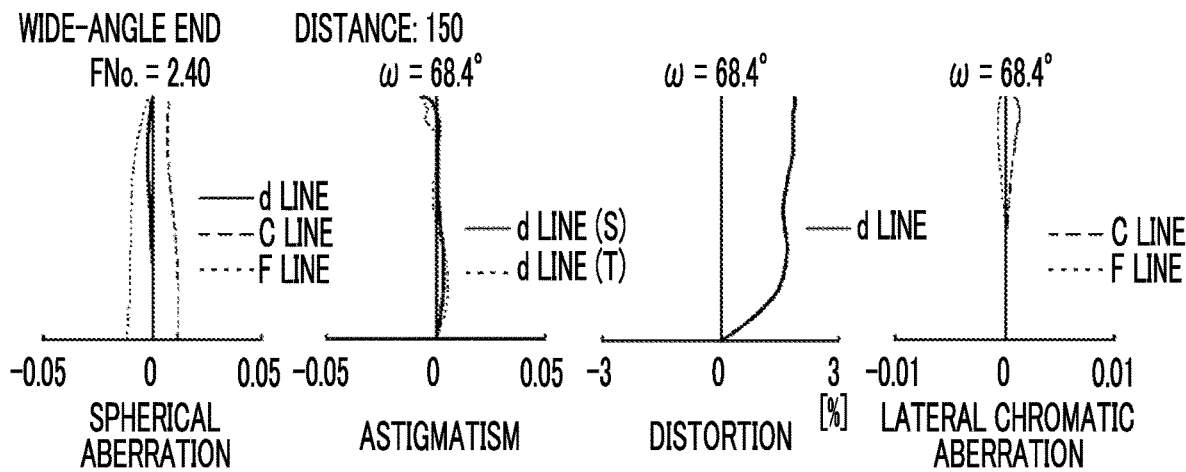
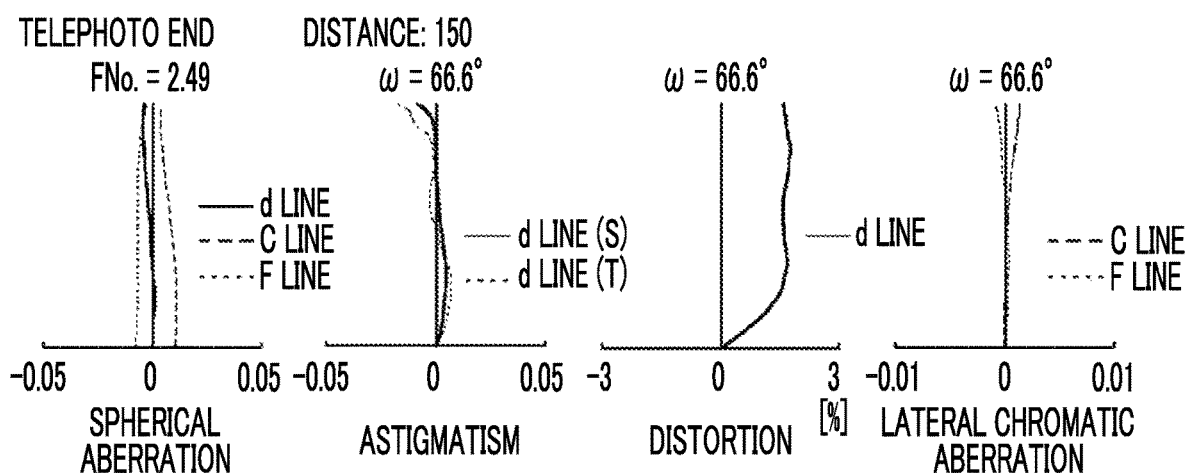
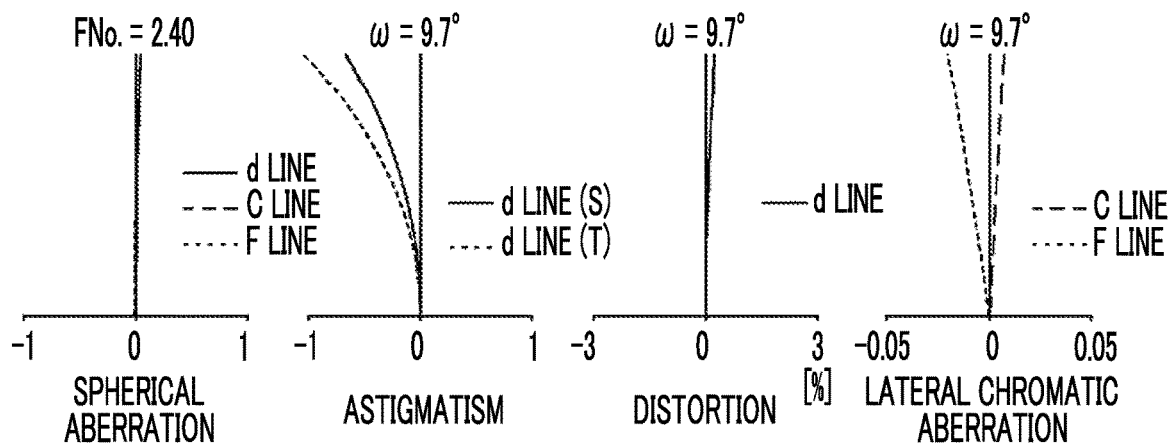

FIG. 12
EXAMPLE 4
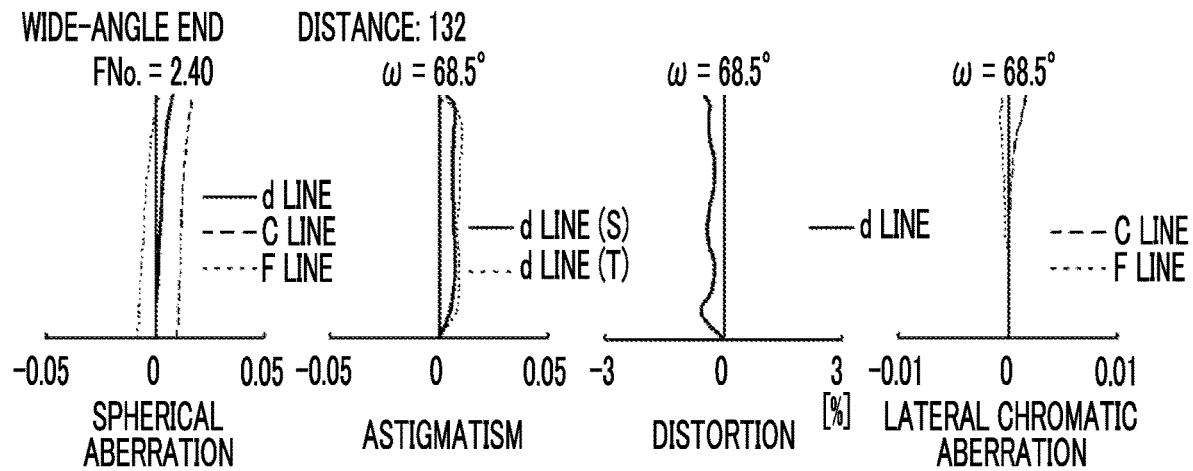
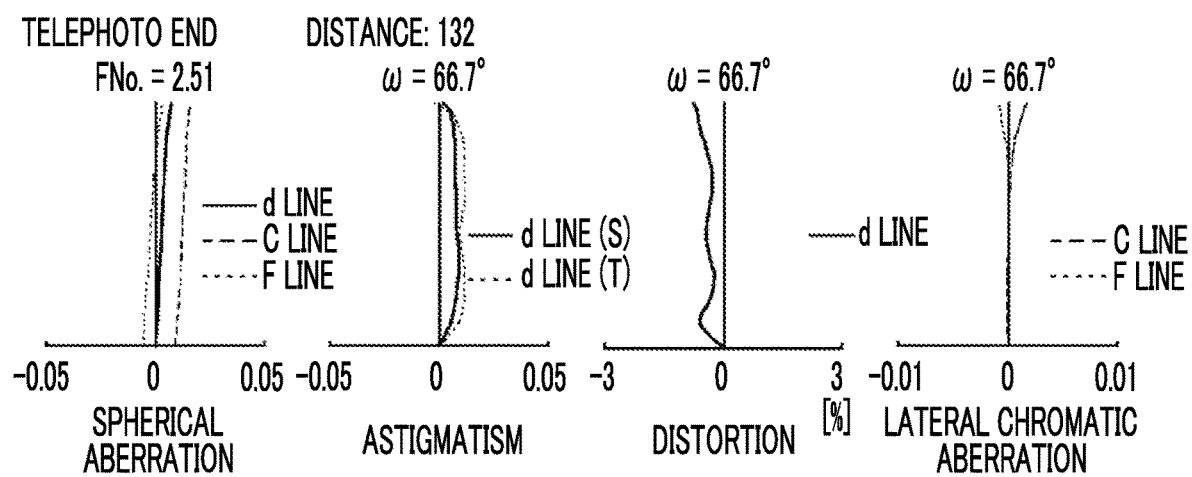
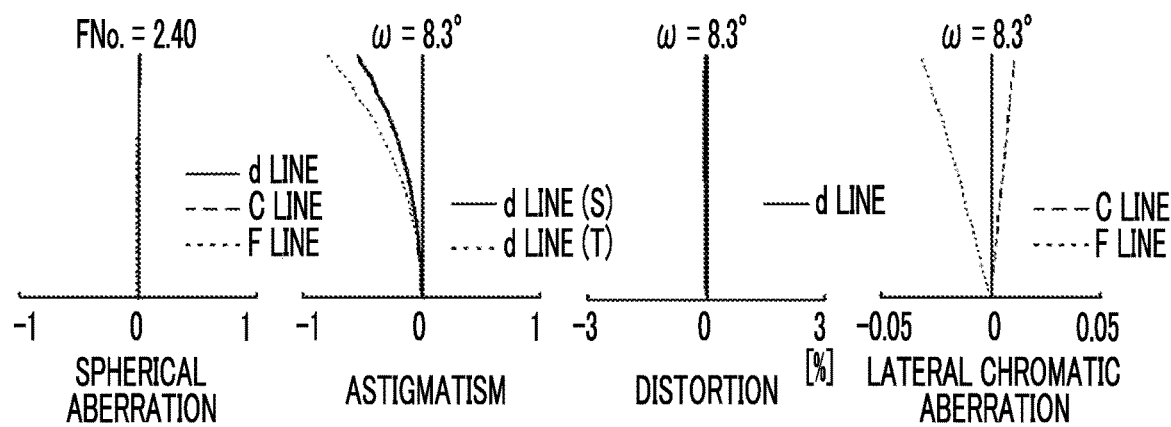

IMAGING OPTICAL SYSTEM, PROJECTION DISPLAY DEVICE, AND IMAGING APPARATUS

CROSS REFERENCE TO RELATED APPLICATIONS

The present application claims priority under 35 U.S.C. § 119 to Japanese Patent Application No. 2018-179426 filed on Sep. 25, 2018, and Japanese Patent Application No. 2019-021042 filed on Feb. 7, 2019. The above applications are hereby expressly incorporated by reference, in its entirety, into the present application.

BACKGROUND OF THE INVENTION

1. Field of the Invention

The present disclosure relates to an imaging optical system, a projection display device, and an imaging apparatus.

2. Description of the Related Art

In the related art, a projection display device using a light valve such as a liquid crystal display element or a digital micromirror device (DMD: registered trademark) display element has been widely used.

In this type of projection display device, it is required to increase a degree of freedom of setting a distance to a screen and to further improve an installation property in an indoor space. For this reason, strong demand has been made for a projection display device being equipped with a high-versatile imaging optical system therein, that is, an imaging optical system that has a zooming function has a compact configuration, and has higher performance and wider angle.

In order to meet the demand, an imaging optical system is suggested that is a relay-type imaging optical system forming an intermediate image and comprises a movable lens group that moves during zooming in a part of a relay lens (see, for example, JP2015-152890A).

SUMMARY OF THE INVENTION

In the imaging optical system disclosed in JP2015-152890A, at the time of widening an angle of view, an entire lens length and a lens diameter are made large. However, there is no room in which a reflector, such as a mirror in which an optical axis is bent, is inserted, which may result in a problem that miniaturization is difficult. Furthermore, since the lens diameter of the part of the relay lens comprising the movable lens group that moves during zooming is large, in a case where a mechanism for moving the movable lens group is included, there is a problem that the size of the imaging optical system increases.

The invention has been made in consideration of the above-mentioned circumstances, and the object of the disclosure is to provide an imaging optical system that has a compact configuration, has an wide angle of view, and has high optical performance in which various aberrations are favorably corrected, a projection display device comprising the imaging optical system, and an imaging apparatus comprising the imaging optical system.

The specific means for achieving the object includes the following aspects.

<1> An imaging optical system consisting of, in order from an magnification side along an optical axis: a first lens group; and a second lens group, in which an intermediate image is formed between the first lens group and the second lens group on the optical axis, at least one of the first lens group or the second lens group comprises a reflector that bends the optical axis, the second lens group comprises a movable lens group that moves during zooming, and, assuming that distortion of a maximum image height on a reduction side of the second lens group at a wide-angle end is Dr, a difference in an optical axis direction between a paraxial image plane of the maximum image height and a tangential image plane on a reduction side of the second lens group at the wide-angle end is Tr, a difference in the optical axis direction between the paraxial image plane of the maximum image height and a sagittal image plane on the reduction side of the second lens group at the wide-angle end is Sr, and a focal length of the entire system at the wide-angle end is fw, the following Conditional Expressions (1) and (2) are satisfied.

$$-1 < Dr < 1 \tag{1}$$

$$-5 < (Tr+Sr)/|fw| < -0.5 \tag{2}$$

<2> The imaging optical system according to <1>, in which, assuming that a focal length of the second lens group at the wide-angle end is fr, Conditional Expression (3) is satisfied.

$$5 < fr/|fw| < 100 \tag{3}$$

<3> The imaging optical system according to <1> or <2>, in which, assuming that a maximum value of heights of a principal ray in lens surfaces in the movable lens group at the wide-angle end is Hzmax and the maximum image height on a reduction side of the entire system is Imax, Conditional Expression (4) is satisfied.

$$Hzmax/Imax < 1.5 \tag{4}$$

<4> The imaging optical system according to any one of <1> to <3>, in which the reflector comprises, in order from the magnification side along the optical axis, a first reflector that bends the optical axis by 90° and a second reflector that bends the optical axis by 90°.

<5> The imaging optical system according to <4>, in which, assuming that a distance on the optical axis from a lens surface closest to the magnification side to the first reflector is La, a distance on the optical axis from the first reflector to the second reflector is Lb, and a distance on the optical axis from the second reflector to a lens surface closest to the reduction side is Lc, Conditional Expressions (5) and (6) are satisfied.

$$1 < Lc/La < 2 \tag{5}$$

$$1.2 < Lb/La < 2.5 \tag{6}$$

<6> The imaging optical system according to any one of <1> to <5>, in which the reduction side is telecentric.

<7> The imaging optical system according to <1>, in which Conditional Expression (1-1) is satisfied.

$$-0.5 < Dr < 0.5 \tag{1-1}$$

<8> The imaging optical system according to <1>, in which Conditional Expression (2-1) is satisfied.

$$-3 < (Tr+Sr)/|fw| < -1 \tag{2-1}$$

<9> The imaging optical system according to <2>, in which Conditional Expression (3-1) is satisfied.

$$10 < fr/|fw| < 30 \tag{3-1}$$

<10> The imaging optical system according to <3>, in which Conditional Expression (4-1) is satisfied.

$$0 \leq Hz\max/I\max < 1 \quad (4\text{-}1)$$

<11> A projection display device comprising a light valve that outputs an optical image based on image data and the imaging optical system according to any one of <1> to <10>, in which the imaging optical system projects the optical image, which is output from the light valve, on a screen.

<12> An imaging apparatus comprising the imaging optical system according to any one of <1> to <10>.

In the present specification, the terms "consisting of ~" and "consists of ~" means that not only the above-mentioned elements may be included, but also a lens that has substantially no refractive power, an optical element other than the lens, such as a stop, a filter, and a cover glass, and mechanism parts, such as a lens flange, a lens barrel, an imaging element, and a camera shake correction mechanism may be included.

In addition, it is intended that "lens group" may include optical elements other than lenses, such as a stop, a mask, a cover glass, a filter, a mirror, and a prism, in addition to lenses.

Further, among the symbols of the Conditional Expressions, the focal length is a paraxial focal length. Each conditional expression calculates the reduction side of the entire system as telecentric. An aberration amount of the second lens group is evaluated in a state in which an image position on the reduction side of the entire system and an image position on the reduction side of the second lens group are performed registration. The values used in conditional expressions are values on the d line basis. A sign of the focal power and surface shape of an aspheric surface are considered in terms of the paraxial region unless otherwise noted. The "d line", "C line" and "F line" described in the present specification are bright lines, the wavelength of d line is 587.56 nm (nanometers), the wavelength of C line is 656.27 nm (nanometers), and the wavelength of F line is 486.13 nm (nanometers).

According to the embodiment of the present disclosure, it is possible to provide an imaging optical system that has a compact configuration, has a wide angle of view, and has high optical performance in which various aberrations are favorably corrected, a projection display device comprising the imaging optical system, and an imaging apparatus comprising the imaging optical system.

BRIEF DESCRIPTION OF THE DRAWINGS

FIG. 9 is a diagram of aberrations of the imaging optical system of Example 1 of the present invention.

FIG. 10 is a diagram of aberrations of the imaging optical system of Example 2 of the present invention.

FIG. 11 is a diagram of aberrations of the imaging optical system of Example 3 of the present invention.

FIG. 12 is a diagram of aberrations of the imaging optical system of Example 4 of the present invention.

DESCRIPTION OF THE PREFERRED EMBODIMENTS

Figure 1:
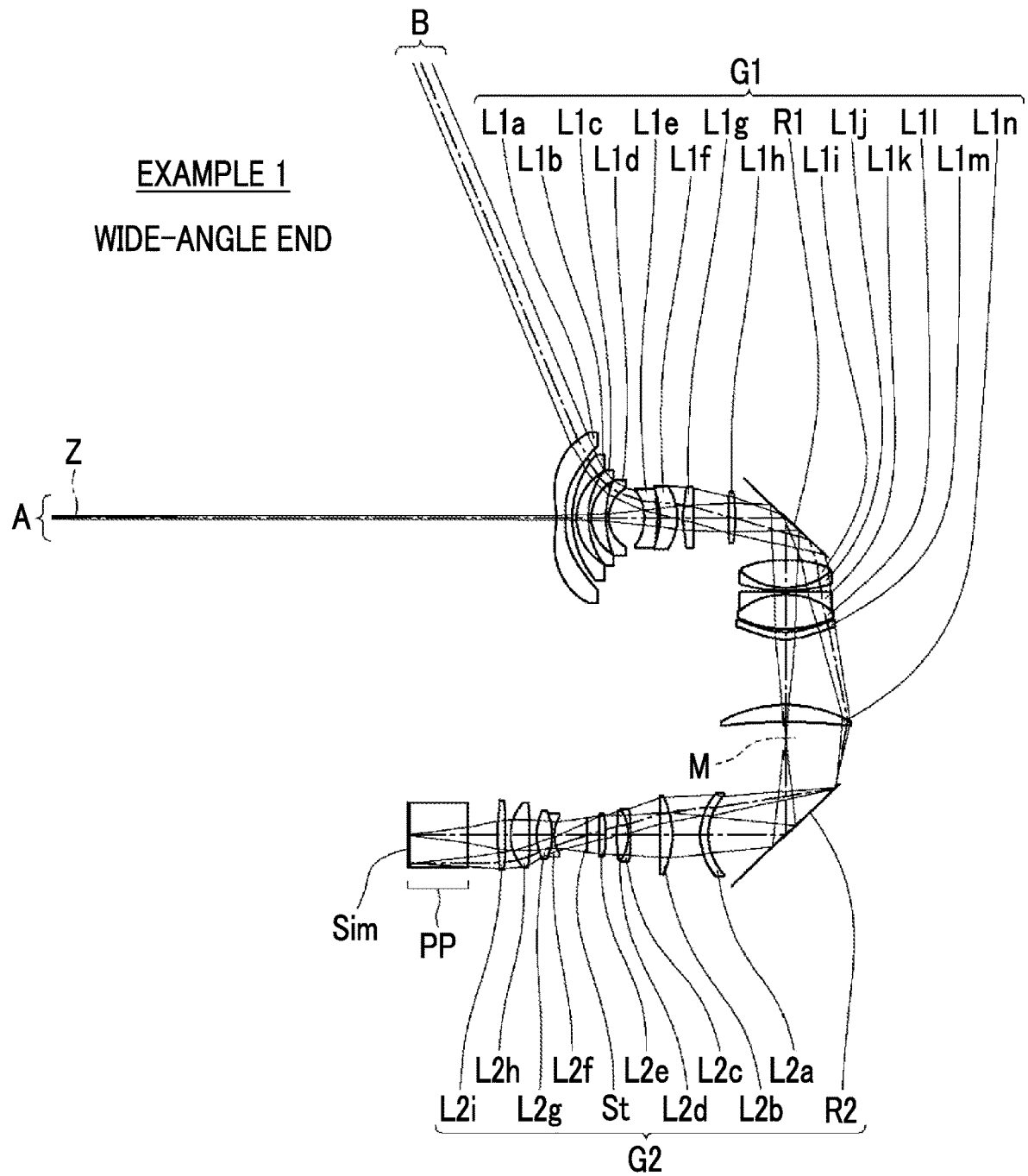
FIG. 1 is a cross-sectional view illustrating a lens configuration of an imaging optical system (common to Example 1) according to an embodiment of the present invention.

Hereinafter, an embodiment of the present invention will be described in detail with reference to the drawing. FIG. 1 is a cross-sectional view illustrating a lens configuration of an imaging optical system according to an embodiment of the present invention. The configuration example shown in FIG. 1 is the same as the configuration of the imaging optical system of Example 1 described later. In FIG. 1, the wide-angle end state is shown, and at the time when an optical axis is developed with reference to the optical axis on a magnification side, a left side is the magnification side and a right side is a reduction side. Further, the aperture stop St in the drawing does not necessarily indicate its size and shape, and indicates its position on the optical axis Z. In addition, on-axis rays A and rays with the maximum angle of view B are written together as the rays.

The imaging optical system is, for example, mounted on a projection display device, and can be used to project image information displayed on a light valve onto a screen. In FIG. 1, assuming that the imaging optical system is mounted on a projection display device, an optical member PP such as a filter or a prism used in a color synthesizing section or an illumination light separating section and an image display surface Sim of the light valve are also shown. In the projection display device, rays, which are made to have image information through the image display element disposed on the image display surface Sim, are incident into the imaging optical system through the optical member PP, and are projected onto the screen, which is not shown in the drawing, through the imaging optical system.

As shown in FIG. 1, the imaging optical system of the present embodiment consists of a first lens group G1 and a second lens group G2 in order from the magnification side to the reduction side along the optical axis Z, and is a relay type imaging optical system in which an intermediate image M is formed between the first lens group G1 and the second lens group G2 on the optical axis Z. In FIG. 1, the intermediate image M is schematically shown, and not shown in its actual shape.

As described above, in the imaging optical system that forms the intermediate image M, it is possible to secure a back focus of an appropriate length and reduce the lens diameter on the magnification side, which makes the imaging optical system to have a configuration suitable for a wide angle.

In addition, at least one of the first lens group G1 or the second lens group G2 includes a reflector that bends the optical axis. An optical element having a reflective surface, such as a mirror or a prism, can be used as the reflector. In the imaging optical system of the present embodiment, the first lens group G1 includes a first reflector R1 and the second lens group G2 includes a second reflector R2, by way of example. The relay-type imaging optical system generally has a long total length of the lens system. However, it can be miniaturized by providing the reflector and bending the optical axis. The reflector may be interposed between lenses in the lens group or may be disposed closest to the magnification side or closest to the reduction side.

Further, the second lens group G2, which is the relay lens group, includes a movable lens group that moves during zooming. In the imaging optical system of the present embodiment, the second lens group G2 includes, for example, a first movable lens group, which is the lens L2$b$ in the drawing, and a second movable lens group composed of six lenses, that is, lenses L2$c$ to L2$h$. During zooming, the first movable lens group and the second movable lens group move along the optical axis so as to change distance between the groups adjacent to each other in a direction of the optical axis. As described above, since the second lens group G2 as the relay lens group includes movable lens groups, rather than the first lens group G1 as the wide angle lens group, fluctuations in field curvature and distortion can be reduced.

Assuming that distortion of a maximum image height on a reduction side of the second lens group G2 at a wide-angle end (the unit thereof is %) is Dr, a difference in an optical axis direction between a paraxial image plane of the maximum image height and a tangential image plane on the reduction side of the second lens group G2 at the wide angle is Tr, a difference in the optical axis direction between the paraxial image plane of the maximum image height and a sagittal image on the reduction side of the second lens group G2 at the wide-angle end is Sr, and a focal length of the entire system at the wide-angle end is fw, the imaging optical system is configured such that the following Conditional Expressions (1) and (2) are satisfied.

$$-1 < Dr < 1 \quad (1)$$

$$-5 < (Tr+Sr)/|fw| < -0.5 \quad (2)$$

In a wide-angle imaging optical system, many negative lenses are used on the magnification side, so negative distortion is apt to occur in the first lens group G1. Therefore, at the time when large negative distortion occurs in the second lens group G2, distortion the entire system including the first lens group G1 and the second lens group G2 is difficult to be corrected. From the above, by not allowing the result of Conditional Expression (1) to be equal to or less than the lower limit and not allowing the negative distortion of the second lens group G2 to be too large, it is possible to reduce the distortion of the entire system.

In the second lens group G2 as the relay lens group, negative distortion that has in a positive lens closer to the reduction side than an aperture stop St (in a case where the aperture stop is in the first lens group G1, a position conjugate to the aperture stop in the second lens group G2) is eliminated by a positive lens closer to the magnification side than the aperture stop St. Further, in the above-mentioned wide-angle imaging optical system, negative distortion is apt to occur in the first lens group G1. Accordingly, in order to the negative distortion that has occurred in the first lens group G1 is eliminated, and generate positive distortion in the second lens group G2, a positive lens is required at a position closer to the magnification side than the aperture stop St. Therefore, a positive lens is required in the vicinity of an intermediate image M, and a ray diameter in the vicinity of the intermediate image M becomes large, such that the diameter of the second lens group G2 as the relay lens group tends to be increased. From the above, by not allowing the result of Conditional Expression (1) to be equal to or larger than the upper limit, and not allowing the positive distortion of the second lens group G2 to be too large, it is possible to prevent the diameter of the second lens group G2 from being large. The above description has been given as a case in which the aperture stop St is present as an actual part. However, even in a case where the aperture stop St is not present as an actual part since the position of the intersection between the principal ray and the optical axis corresponds to the aperture stop St from the optical perspective, the same effect described above is achieved.

In addition, in a case where Conditional Expression (1-1) is satisfied, it is possible to obtain more favorable characteristics.

$$-0.5 < Dr < 0.5 \quad (1-1)$$

In the wide-angle imaging optical system, since may negative lenses are used on the magnification side, the Petzval sum of the first lens group G1 is negative, and large positive field curvature is apt to occur. Therefore, field curvature of the entire system can be corrected by generating an appropriate amount of negative field curvature in the second lens group G2 and eliminating field curvature in both of the first lens group G1 and the second lens group G2. By not allowing the result of Conditional Expression (2) to be equal to or less than the lower limit, and in the second lens group G2, not allowing negative field curvature to be generated beyond what is required to eliminate the positive field curvature that has occurred in the first lens group G1, it is possible to reduce field curvature of the entire system. By not allowing the result of Conditional Expression (2) to be equal to or larger than the upper limit, and in the second lens group G2, by allowing negative field curvature to be generated to eliminate the positive field curvature that has occurred in the first lens group G1, it is possible to reduce field curvature of the entire system. In addition, in a case where Conditional Expression (2-1) is satisfied, it is possible to obtain more favorable characteristics.

$$-3 < (Tr+Sr)/|fw| < -1 \quad (2-1)$$

In the imaging optical system of the present embodiment, assuming that the focal length of the second lens group G2 at the wide-angle end is fr, and the focal length of the entire system at the wide-angle end is fw, it is preferable that Conditional Expression (3) is satisfied. By satisfying Conditional Expression (3) and allowing the second lens group G2, which is the relay lens group, to have positive refractive power, peripheral rays from the first lens group G1 to the second lens group G2 can be narrowed, which makes it possible to reduce the lens diameter of the second lens group G2. By not allowing the result of Conditional Expression (3) to be equal to or less than the lower limit, it is possible to prevent the refractive power of the second lens group G2 from being too strong. Therefore, it is possible to favorably correct aberrations such as spherical aberration, chromatic aberration and the like in the second lens group G2. By not allowing the result of Conditional Expression (3) to be equal to or larger than the upper limit, it is possible to prevent the refractive power of the second lens group G2 from being too weak. Therefore, it is possible to suppress an increase in the lens diameter of the second lens group G2. In addition, in a case where Conditional Expression (3-1) is satisfied, it is possible to obtain more favorable characteristics.

$$5 < fr/|fw| < 100 \quad (3)$$

$$10 < fr/|fw| < 30 \quad (3\text{-}1)$$

Furthermore, assuming that a maximum value of heights of the principal ray in the lens surfaces in the movable lens group at the wide-angle end is Hz max and a maximum image height on the reduction side of the entire system is I max, it is preferable that Conditional Expression (4) is satisfied. By not allowing the result of Conditional Expression (4) to be equal to or larger than the upper limit, it is possible to suppress the increase in the lens diameter of the movable lens group, which is advantageous for miniaturizing the imaging optical system. In addition, in a case where Conditional Expression (4-1) is satisfied, it is possible to obtain more favorable characteristics.

$$Hz\max/I\max < 1.5 \quad (4)$$

$$0 \leq Hz\max/I\max < 1 \quad (4\text{-}1)$$

It is preferable that the reflector includes the first reflector R1 that bends the optical axis by 90° and the second reflector R2 that bends the optical axis by 90°, in order from the magnification side along the optical axis. Providing two reflectors like this makes the total length of the imaging optical system to be shortened. Furthermore, allowing both of the two reflectors to bend the optical axis by 90° is advantageous for miniaturizing the imaging optical system. In this case, the reflectors may both bend the optical axis by 90° in the same direction, as illustrating in FIG. 1, and may bend the optical axis by 90° in directions opposite to each other, as illustrating in FIG. 2.

In a case where, as the reflector, the first reflector R1 that bends the optical axis by 90° and the second reflector R2 that bends the optical axis by 90° are provided in order from the magnification side along the optical axis, assuming that the distance on the optical axis from the lens surface closest to the magnification side to the first reflector R1 is La, the distance on the optical axis from the first reflector R1 to the second reflector R2 is Lb, and the distance on the optical axis from the second reflector R2 to the lens surface closest to the reduction side is Lc, it is preferable that Conditional Expressions (5) and (6) are satisfied. By not allowing the results of Conditional Expressions (5) and (6) to be equal to or less than the lower limit, in a case where the imaging optical system is mounted in the projection display device, it is possible to prevent interference between the first lens group G1 and an image engine unit, such as a light valve, disposed on the reduction side of the imaging optical system. By not allowing the results of Conditional Expressions (5) and (6) to be equal to or larger than the upper limit, in a case where the imaging optical system is mounted in the projection display device, it is possible to prevent opening of a distance between the first lens group G1 and the image engine unit, such as the light valve, disposed on the reduction side of the imaging optical system, which is advantageous for miniaturizing the entire device.

$$1 < Lc/La < 2 \quad (5)$$

$$1.2 < Lb/La < 2.5 \quad (6)$$

In the projection display device that projects a high definition image, a so-called a 3CCD system in which an image display element is provided corresponding each wavelength of Red, Green, Blue (RGB) is often adopted. In order to cope with such a system, it is preferable that the reduction side is telecentric. Here, the expression, "the reduction side is telecentric" means a state in which a line bisecting an angle between the upper maximum ray and the lower maximum ray in a cross-section of rays of light condensing at an arbitrary point on an image display surface Sim on the reduction side is nearly parallel to the optical axis. The state is not limited to a state in which the line bisecting the angle is completely parallel to the optical axis, and some difference may be present. Here, some difference means that the inclination of the bisecting line with respect to the optical axis is within the range of ±3°.

Next, numerical examples of the imaging optical system of the embodiment of the present invention will be described.

EXAMPLE 1

Figure 2:
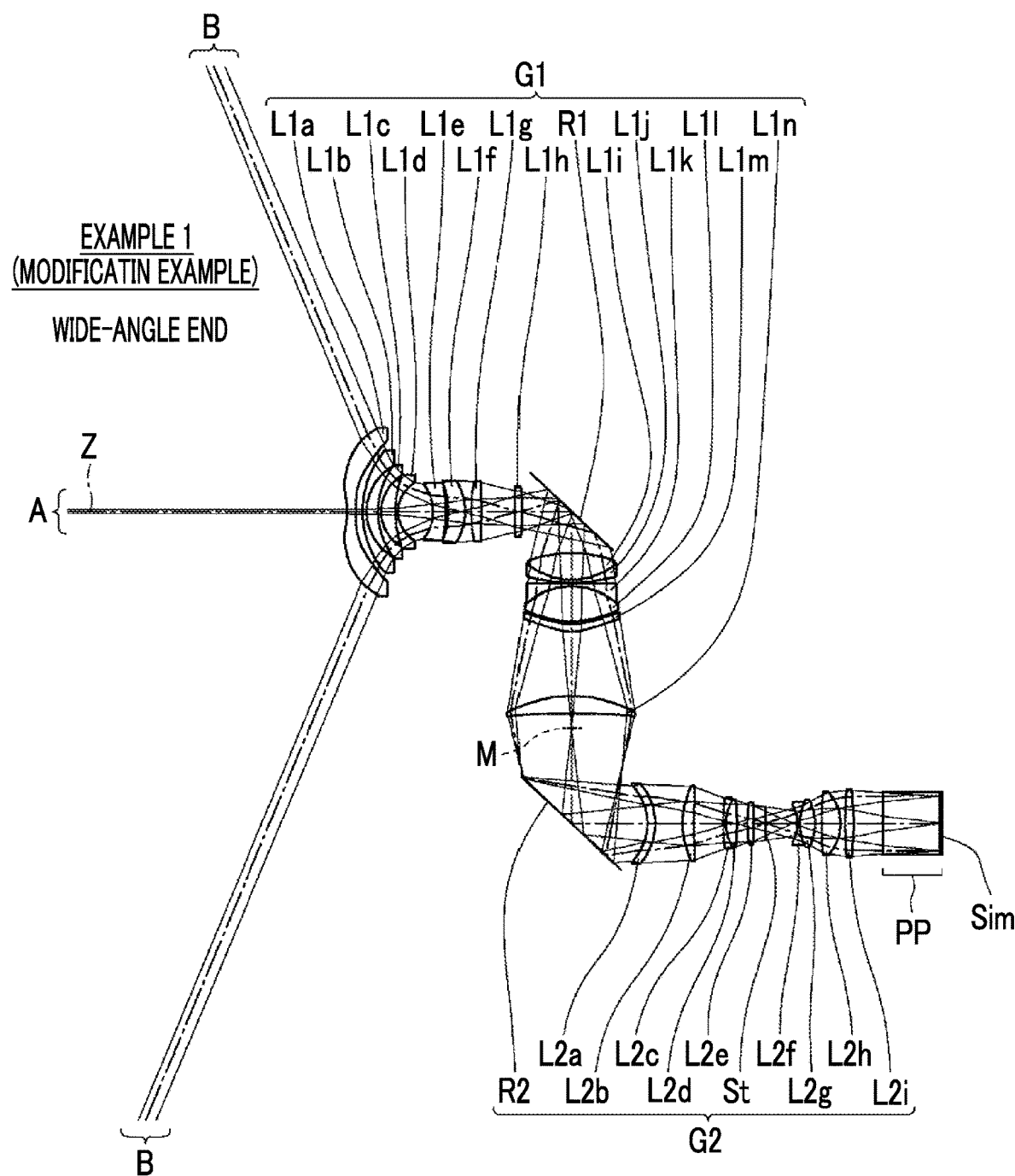
FIG. 2 is a cross-sectional view illustrating a lens configuration of an imaging optical system (common to a modification example of Example 1) according to the embodiment of the present invention.

FIG. 1 is a cross-sectional view illustrating a configuration of an imaging optical system of Example 1, and FIG. 2 is a cross-sectional view illustrating a modification example of the imaging optical system of Example 1. The illustration method of FIG. 1 is as described above, and the illustration method of FIG. 2 is the same as that of FIG. 1. Further, the illustration method is basically the same in Examples 2 to 4.

As shown in FIG. 1, the imaging optical system of Example 1 consists of a first lens group G1 and a second lens group G2 in order from the magnification side to the reduction side along the optical axis Z, and is a relay type imaging optical system in which an intermediate image M is formed between the first lens group G1 and the second lens group G2 on the optical axis Z.

The first lens group G1 is composed of 14 lenses L1a to L1n, and a first reflector R1 disposed between the lens L1h and lens L1i and bending the optical axis Z by 90°.

The second lens group G2 is composed of 9 lenses L2a to L2i, and a second reflector R2 disposed on the magnification side of the lens L2a and bending the optical axis Z by 90°. In the second lens group G2, a first movable lens group is composed of the lens L2b, and a second movable lens group is composed of six lenses L2c to L2h. During zooming, the first movable lens group and the second movable lens group move along the optical axis so as to change the distance between the groups adjacent to each other in a direction of the optical axis Z.

The first reflector R1 and the second reflector R2 are both disposed to bend the optical axis by 90° in the same direction.

In a modification example of the imaging optical system of Example 1 shown in FIG. 2, the first reflector R1 and the second reflector R2 are disposed to bend the optical axis by 90° in directions opposite to each other.

Table 1 shows basic lens data of the imaging optical system of Example 1, Table 2 shows data about the specification, Table 3 shows data about variable surface distances, and Table 4 shows data about aspheric surface coefficients thereof. Hereinafter, meanings of the reference signs in the tables are, for example, as described in Example 1, and are basically the same as those in Examples 2 to 4.

In the lens data of Table 1, a column of the surface number shows surface numbers, where a surface of the component closet to the magnification side is designated as 1 and the number sequentially increases toward the reduction side, a column of the radius of curvature shows the radii of curvature of respective surfaces, and a column of the surface spacing shows spacings on the optical axis Z between the respective surfaces and the subsequent surfaces. Further, a column of n shows a refractive index of each optical element at the d line, and the column of v shows an Abbe number of each optical element at the d line. Furthermore, a sign of the radius of curvature is positive in a case where a surface has a shape convex toward the magnification side, and is negative in a case where a surface has a shape convex toward the reduction side. In the basic lens data, the aperture stop St and the optical member PP are additionally noted. In a place of a surface number of a surface corresponding to the aperture stop St, the surface number and a term of (stop) are noted. Further, in the lens data of Table 1, in each place of the surface distance which is variable during focusing, DD[surface number] is noted. Numerical values each corresponding to the DD[surface number] are shown in Table 3.

In the data about the specification of Table 2, values of the zoom ratio, absolute values of the focal length |f|, the back focal length Bf, the F number FNo., and the total angle of view 2ω[°] are noted.

In the lens data of Table 1, the reference sign * is attached to surface numbers of aspheric surfaces, and radii of curvature of the aspheric surfaces are represented by numerical values of paraxial radii of curvature. The data about aspheric surface coefficients of Table 4 shows the surface numbers of the aspheric surfaces and aspheric surface coefficients of the aspheric surfaces. The "E±n" (n: an integer) in numerical values of the aspheric surface coefficients of Table 4 indicates "×10^{±n}". The aspheric surface coefficients are values of the coefficients KA and Am in aspheric surface expression represented as the following expression.

$$Zd = C \cdot h^2 / \{1 + (1 - KA \cdot C^2 \cdot h^2)^{1/2}\} + \Sigma Am \cdot h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis), C is an inverse of a paraxial radius of curvature, and KA and Am are aspheric coefficients, and Σ in the aspheric depth Zd means the sum of m.

In the basic lens data and the data about specification, values standardized at the focal length at the wide-angle end is shown. The unit of angle is °.

TABLE 1

Example 1 Lens Data (n, ν at the d line)

| Surface Number | Radius of Curvature | Surface Distance | n | ν |
|---|---|---|---|---|
| *1 | −4.1545 | 0.7999 | 1.53158 | 55.08 |
| *2 | −10.6553 | 0.5600 | | |
| 3 | 9.1859 | 0.3600 | 1.77250 | 49.62 |
| 4 | 5.0305 | 1.0131 | | |
| 5 | 7.4758 | 0.2600 | 1.84666 | 23.78 |
| 6 | 3.9905 | 1.2632 | | |

TABLE 1-continued

Example 1 Lens Data (n, ν at the d line)

| Surface Number | Radius of Curvature | Surface Distance | n | ν |
|---|---|---|---|---|
| 7 | 10.3971 | 0.2200 | 1.71300 | 53.94 |
| 8 | 3.2212 | 3.0822 | | |
| 9 | −4.3318 | 1.0998 | 1.48749 | 70.44 |
| 10 | −15.4301 | 0.2090 | | |
| 11 | −7.8593 | 1.4941 | 1.51742 | 52.43 |
| 12 | −5.6609 | 0.5386 | | |
| 13 | 13.8954 | 0.8753 | 1.80610 | 33.27 |
| 14 | −102.4289 | 2.9835 | | |
| 15 | 42.9097 | 0.5993 | 1.74950 | 35.28 |
| 16 | −18.5900 | 4.3215 | | |
| The first reflector | ∞ | 3.8647 | | |
| 17 | 10.5567 | 2.5084 | 1.49700 | 81.61 |
| 18 | −5.7610 | 0.2820 | 1.84666 | 23.78 |
| 19 | −13.0118 | 0.0722 | | |
| 20 | ∞ | 0.2800 | 1.84666 | 23.78 |
| 21 | 5.9750 | 3.1496 | 1.49700 | 81.61 |
| 22 | −8.5088 | 0.2737 | | |
| *23 | −4.8146 | 0.6800 | 1.51007 | 56.24 |
| *24 | −4.2455 | 6.0218 | | |
| 25 | 10.8969 | 1.5566 | 1.80518 | 25.46 |
| 26 | 46.3502 | 10.3125 | | |
| The second reflector | ∞ | 6.6398 | | |
| *27 | −5.2628 | 0.6999 | 1.51007 | 56.24 |
| *28 | −5.6967 | DD[28] | | |
| 29 | 8.6244 | 0.9926 | 1.77250 | 49.62 |
| 30 | 270.4297 | DD[30] | | |
| 31 | 22.0413 | 0.2000 | 1.84666 | 23.78 |
| 32 | 4.4142 | 0.9776 | 1.51680 | 64.20 |
| 33 | −33.1623 | 0.9953 | | |
| 34 | 18.0318 | 0.5380 | 1.80518 | 25.46 |
| 35 | −36.5595 | 1.0531 | | |
| 36(Stop) | ∞ | 2.7843 | | |
| 37 | −3.6089 | 0.2000 | 1.77250 | 49.62 |
| 38 | 5.4293 | 1.3198 | 1.49700 | 81.61 |
| 39 | −5.4293 | 0.5908 | | |
| 40 | 32.4635 | 1.6690 | 1.49700 | 81.61 |
| 41 | −4.5285 | DD[41] | | |
| 42 | 27.8016 | 0.7396 | 1.84666 | 23.78 |
| 43 | −27.8016 | 2.5446 | | |
| 44 | ∞ | 5.2096 | 1.51633 | 64.14 |
| 45 | ∞ | | | |

TABLE 2

Example 1 Specification (d line)

| | Wide-angle end | Telephoto end |
|---|---|---|
| Zoom ratio | 1.00 | 1.10 |
| |f| | 1.00 | 1.10 |
| Bf | 5.97 | 5.97 |
| FNo. | 2.40 | 2.49 |
| 2ω[°] | 137.0 | 133.2 |

TABLE 3

Example 1 Variable Surface Distance

| | Wide-angle end | Telephoto end |
|---|---|---|
| DD[28] | 2.4044 | 1.0863 |
| DD[30] | 2.5800 | 2.9950 |
| DD[41] | 0.4000 | 1.3030 |

TABLE 4

Example 1 Aspheric Surface Coefficient

| Surface Number | 1 | 2 | 23 | 24 |
|---|---|---|---|---|
| KA | −5.88485309E−01 | −2.67069029E+00 | −2.16710178E+00 | −1.59414900E+00 |
| A3 | 5.80144623E−02 | 6.20189624E−02 | 0.00000000E+00 | 0.00000000E+00 |
| A4 | −1.30172308E−02 | −2.28104869E−02 | 7.41372713E−03 | 6.49436894E−03 |
| A5 | 9.48694342E−04 | 6.47938847E−03 | −6.97790017E−03 | −4.40306962E−03 |
| A6 | 9.49648797E−04 | −4.40369971E−04 | 3.36188936E−03 | 1.01287937E−03 |
| A7 | −4.90418674E−04 | −2.67652006E−04 | 2.29165125E−04 | 1.10786608E−03 |
| A8 | 6.64281236E−05 | −4.02834763E−05 | −8.31663692E−04 | −6.70039030E−04 |
| A9 | 1.70286164E−05 | 5.45925049E−05 | 1.38746180E−04 | −6.87254981E−05 |
| A10 | −6.12543675E−06 | −5.06072745E−06 | 1.09827462E−04 | 1.30031180E−04 |
| A11 | 1.28126795E−07 | −2.75955188E−06 | −3.84449107E−05 | −1.65722432E−05 |
| A12 | 1.79154417E−07 | 4.40168978E−07 | −4.87132704E−06 | −1.01035495E−05 |
| A13 | −1.90626245E−08 | 7.33322706E−08 | 3.61614874E−06 | 2.61248502E−06 |
| A14 | −2.17463521E−09 | −1.52138561E−08 | −9.41126971E−08 | 3.14921349E−07 |
| A15 | 4.39245344E−10 | −1.14932546E−09 | −1.61630961E−07 | −1.50947685E−07 |
| A16 | 3.44909640E−12 | 2.87686403E−10 | 1.50078312E−08 | 5.46025075E−10 |
| A17 | −4.32556851E−12 | 9.84911065E−12 | 3.54266040E−09 | 4.05254384E−09 |
| A18 | 1.45963093E−13 | −2.90516270E−12 | −4.69612379E−10 | −2.46243709E−10 |
| A19 | 1.61253971E−14 | −3.76713714E−14 | −3.08935482E−11 | −4.25149287E−11 |
| A20 | −9.09523883E−16 | 1.25705812E−14 | 4.99166058E−12 | 3.98713891E−12 |

| Surface Number | 27 | 28 |
|---|---|---|
| KA | 0.00000000E+00 | 0.00000000E+00 |
| A3 | 0.00000000E+00 | 0.00000000E+00 |
| A4 | −4.66319123E−04 | −2.99290155E−04 |
| A5 | 1.74434014E−04 | 1.22129647E−04 |
| A6 | 9.34045911E−06 | 1.12309083E−05 |
| A7 | −5.20218194E−05 | −3.44676644E−05 |
| A8 | 8.31727162E−06 | 5.07033633E−06 |
| A9 | 1.83302991E−06 | 1.17237555E−06 |
| A10 | −4.45787223E−07 | −2.58539659E−07 |

FIG. 9 shows a diagram of aberrations of the imaging optical system of Example 1. In FIG. 9, in order from the left side, spherical aberration, astigmatism, distortion, and lateral chromatic aberration are shown. FIG. 9 shows, at the upper part thereof, respective aberration diagrams in a state in which the distance from a magnification side imaging plane to the surface of the first lens group G1 closest to the magnification side at the wide-angle end is set to the distance described in the drawing(in Example 1, 151), at the middle part, respective aberration diagrams in a state in which the distance from the magnification side imaging plane to the surface of the first lens group G1 at the telephoto end is set to the distance described in the drawing (in Example 1, 151), and at the lower part, respective aberration diagrams of the second lens group G2 at the wide-angle end.

In the spherical aberration diagram, aberrations at the d line, the C line, and the F line are indicated by the solid line, the long dashed line and the short dashed line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line and the F line are respectively indicated by the long dashed line and the short dashed line. In the spherical aberration diagram, FNo. indicates an F number. In other aberration diagrams, w indicates a half angle of view.

EXAMPLE 2

Figure 3:
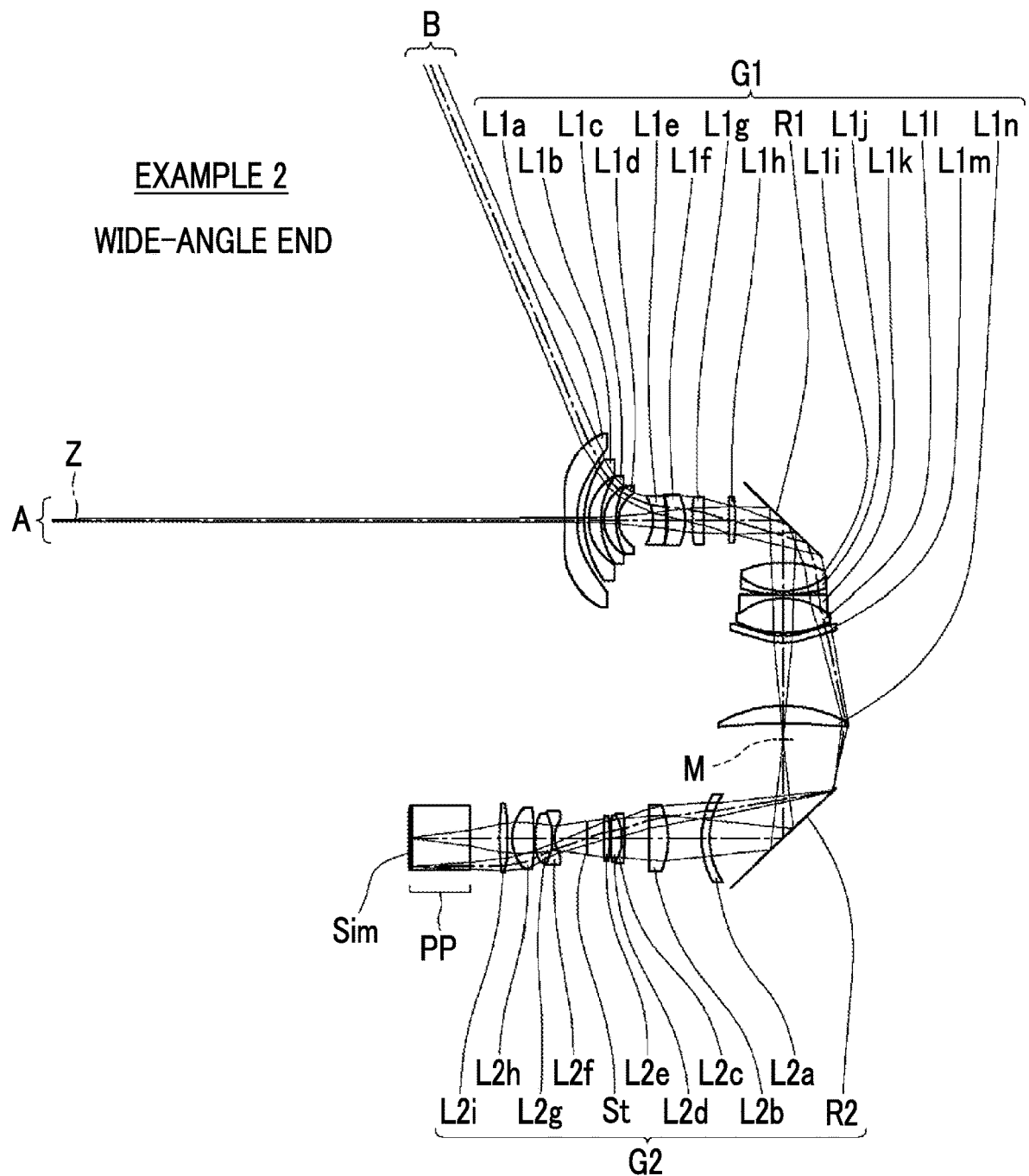
FIG. 3 is a cross-sectional view illustrating a lens configuration of an imaging optical system of Example 2 of the present invention.
Figure 4:
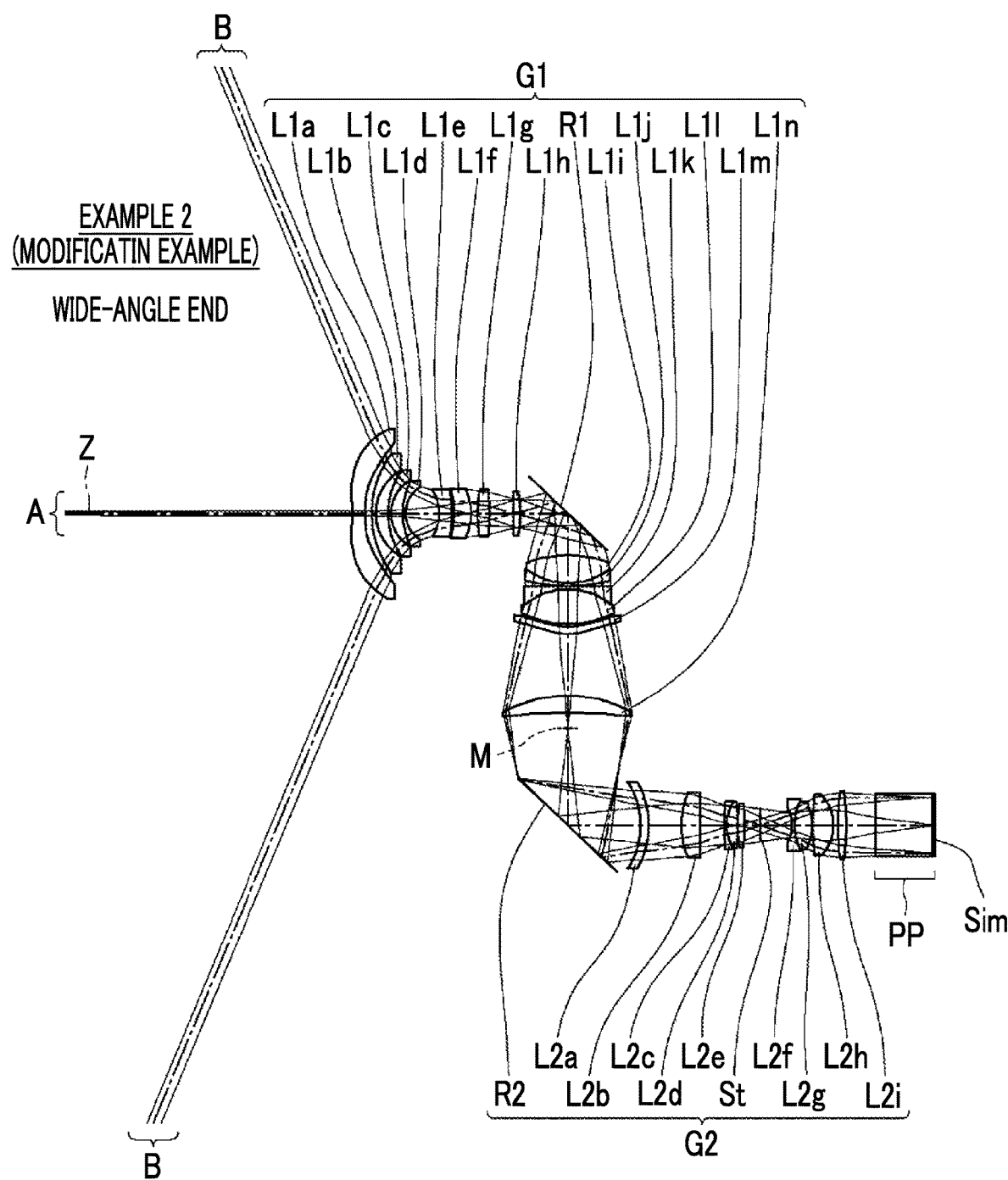
FIG. 4 is a cross-sectional view illustrating a lens configuration of a modification example of the imaging optical system of Example 2 of the present invention.

Next, an imaging optical system of Example 2 will be described. FIG. 3 is a cross-sectional view illustrating a configuration of an imaging optical system of Example 2, and FIG. 4 is a cross-sectional view illustrating a modification example of the imaging optical system of Example 2. The imaging optical system of Example 2 has the same configuration as the imaging optical system of Example 1. Table 5 shows basic lens data of the imaging optical system of Example 2, Table 6 shows data about specification, Table 7 shows data about variable surface distances, Table 8 shows data about aspheric surface coefficients thereof, and FIG. 10 shows respective aberration diagrams.

TABLE 5

Example 2 Lens Data (n, ν at the d line)

| Surface Number | Radius of Curvature | Surface Distance | n | ν |
|---|---|---|---|---|
| *1 | −5.9079 | 1.0788 | 1.53158 | 55.08 |
| *2 | −25.4736 | 0.5890 | | |
| 3 | 9.7505 | 0.3596 | 1.77250 | 49.60 |
| 4 | 4.7786 | 1.0706 | | |
| 5 | 7.3025 | 0.2597 | 1.84666 | 23.78 |
| 6 | 3.7145 | 1.0392 | | |
| 7 | 7.0365 | 0.2199 | 1.71300 | 53.94 |
| 8 | 2.9665 | 2.9612 | | |
| 9 | −4.1804 | 1.0989 | 1.48749 | 70.44 |
| 10 | −17.9678 | 0.1660 | | |
| 11 | −8.7274 | 1.4976 | 1.51742 | 52.43 |
| 12 | −5.7455 | 0.6047 | | |
| 13 | 14.6763 | 0.9824 | 1.80610 | 33.27 |
| 14 | −61.1918 | 2.1942 | | |
| 15 | ∞ | 0.5491 | 1.74950 | 35.28 |
| 16 | −12.7883 | 4.1328 | | |
| The first reflector | ∞ | 3.8817 | | |
| 17 | 9.5882 | 2.5766 | 1.49700 | 81.54 |
| 18 | −5.8250 | 0.2817 | 1.84666 | 23.78 |
| 19 | −13.8999 | 0.0198 | | |

TABLE 5-continued

Example 2 Lens Data (n, ν at the d line)

| Surface Number | Radius of Curvature | Surface Distance | n | ν |
|---|---|---|---|---|
| 20 | ∞ | 0.2797 | 1.84666 | 23.78 |
| 21 | 5.9495 | 3.1498 | 1.49700 | 81.54 |
| 22 | −8.4749 | 0.2428 | | |
| *23 | −4.9040 | 0.6793 | 1.51007 | 56.24 |
| *24 | −4.3065 | 5.7618 | | |
| 25 | 10.7729 | 1.5956 | 1.80518 | 25.46 |
| 26 | 46.2731 | 10.4459 | | |
| The second reflector | ∞ | 6.3542 | | |
| *27 | −7.9915 | 0.6993 | 1.51007 | 56.24 |
| *28 | −8.6678 | DD[28] | | |
| 29 | 8.2588 | 1.6388 | 1.77250 | 49.60 |
| 30 | ∞ | DD[30] | | |
| 31 | 34.0741 | 0.1998 | 1.84666 | 23.78 |
| 32 | 4.3536 | 0.9561 | 1.51680 | 64.20 |
| 33 | −33.8351 | 0.0801 | | |
| 34 | 16.2834 | 0.5492 | 1.80518 | 25.46 |
| 35 | −34.9191 | 1.4025 | | |
| 36(Stop) | ∞ | 2.7898 | | |
| 37 | −3.2753 | 0.1998 | 1.77250 | 49.60 |
| 38 | 5.3721 | 1.5291 | 1.49700 | 81.54 |
| 39 | −5.3721 | 0.0821 | | |
| 40 | 25.6310 | 1.7951 | 1.49700 | 81.54 |
| 41 | −4.3429 | DD[41] | | |
| 42 | 26.1649 | 0.7180 | 1.84666 | 23.78 |
| 43 | −26.1649 | 2.5419 | | |
| 44 | ∞ | 5.2045 | 1.51633 | 64.14 |
| 45 | ∞ | | | |

TABLE 6

Example 2 Specification (d line)

| | Wide-angle end | Telephoto end |
|---|---|---|
| Zoom ratio | 1.00 | 1.10 |
| \|f\| | 1.00 | 1.10 |
| Bf | 5.97 | 5.97 |
| FNo. | 2.40 | 2.49 |
| 2ω[°] | 137.0 | 133.2 |

TABLE 7

Example 2 Variable Surface Distance

| | Wide-angle end | Telephoto end |
|---|---|---|
| DD[28] | 2.8812 | 1.6538 |
| DD[30] | 2.1201 | 2.4791 |
| DD[41] | 0.3994 | 1.2678 |

TABLE 8

Example 2 Aspheric Surface Coefficient

| Surface Number | 1 | 2 | 23 | 24 |
|---|---|---|---|---|
| KA | −7.20476226E−01 | −3.44494389E−01 | −3.15411613E+00 | −1.17118171E+00 |
| A3 | 5.75006814E−02 | 6.78906885E−02 | 0.00000000E+00 | 0.00000000E+00 |
| A4 | −1.72972594E−02 | −2.93415712E−02 | 2.86429932E−03 | 3.45041376E−03 |
| A5 | 7.97691844E−04 | 5.38981746E−03 | −1.15050329E−03 | 1.68988750E−03 |
| A6 | 1.57132058E−03 | 4.32516564E−04 | 1.13239238E−03 | −1.71836545E−03 |
| A7 | −5.18503593E−04 | −1.15006799E−04 | −1.04674457E−03 | 2.00209337E−04 |
| A8 | 1.93557046E−05 | −1.17066206E−04 | 4.76743637E−04 | 4.80310331E−04 |
| A9 | 2.25310382E−05 | 3.91433642E−05 | 2.56875830E−05 | −2.10850001E−04 |
| A10 | −4.27161375E−06 | −8.72372255E−08 | −1.12253925E−04 | −3.68072935E−05 |
| A11 | −2.08528647E−07 | −1.75904815E−06 | 2.37814097E−05 | 3.42203220E−05 |
| A12 | 1.42969725E−07 | 1.97563675E−07 | 1.08285410E−05 | 1.46962438E−07 |
| A13 | −8.81157296E−09 | 3.47096985E−08 | −4.26448341E−06 | −3.01850339E−06 |
| A14 | −1.96414701E−09 | −7.02160093E−09 | −3.40367212E−07 | 2.13772689E−07 |
| A15 | 2.70277271E−10 | −2.92194522E−10 | 3.08402290E−07 | 1.55548465E−07 |
| A16 | 7.39423462E−12 | 1.14703851E−10 | −1.17538677E−08 | −1.80810226E−08 |
| A17 | −2.88172434E−12 | −2.38412308E−13 | −1.01818415E−08 | −4.25599033E−09 |
| A18 | 7.49579344E−14 | −8.85553448E−13 | 9.62485431E−10 | 6.21337245E−10 |
| A19 | 1.11036186E−14 | 1.10267166E−14 | 1.27111026E−10 | 4.71035459E−11 |
| A20 | −5.78506271E−16 | 2.68472348E−15 | −1.61726141E−11 | −7.84817900E−12 |

| Surface Number | 27 | 28 |
|---|---|---|
| KA | 0.00000000E+00 | 0.00000000E+00 |
| A3 | 0.00000000E+00 | 0.00000000E+00 |
| A4 | −2.89239960E−04 | −1.40539423E−04 |
| A5 | 1.48490918E−04 | 9.60707010E−05 |
| A6 | −1.06705449E−05 | 4.34184025E−06 |
| A7 | −3.61122708E−05 | −2.69340928E−05 |
| A8 | 6.76550318E−06 | 4.33647796E−06 |
| A9 | 1.17949562E−06 | 9.18024094E−07 |
| A10 | −3.08590935E−07 | −2.05676424E−07 |

EXAMPLE 3

Figure 5:
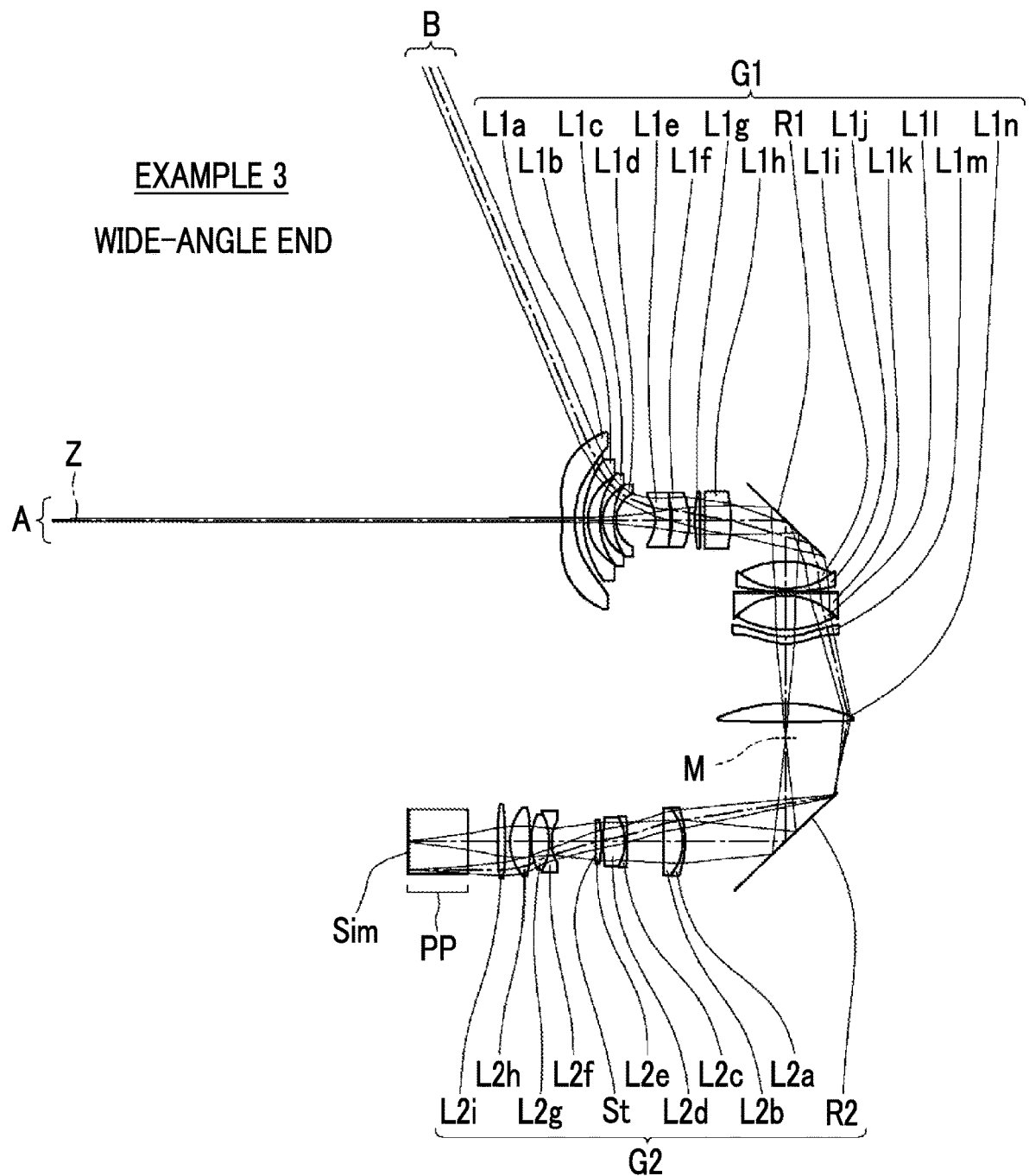
FIG. 5 is a cross-sectional view illustrating a lens configuration of an imaging optical system of Example 3 of the present invention.
Figure 6:
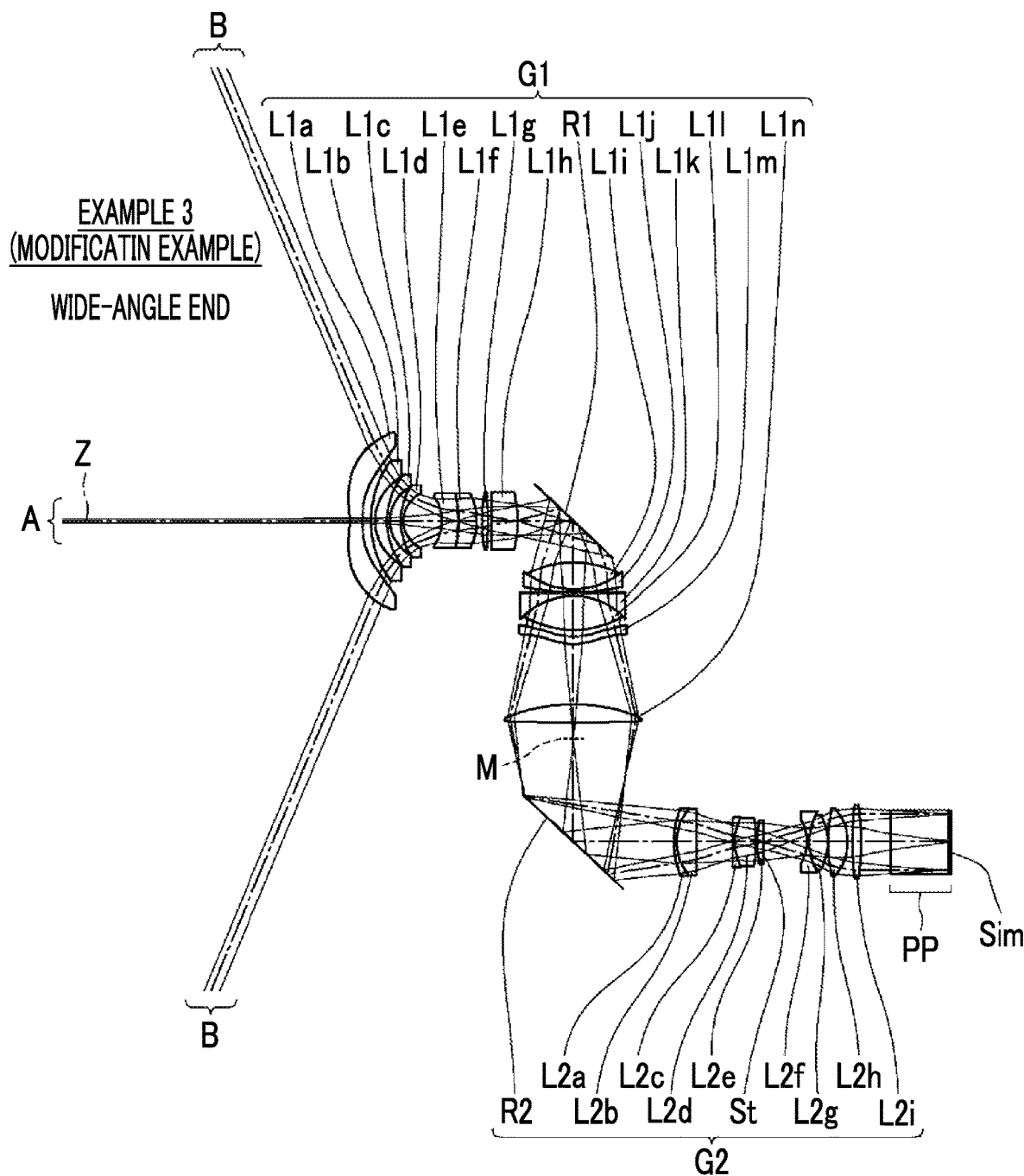
FIG. 6 is a cross-sectional view illustrating a lens configuration of a modification example of the imaging optical system of Example 3 of the present invention.

Next, an imaging optical system of Example 3 will be described. FIG. 5 is a cross-sectional view illustrating a configuration of an imaging optical system of Example 3, and FIG. 6 is a cross-sectional view illustrating a modification example of the imaging optical system of Example 3. The imaging optical system of Example 3 has the same configuration as the imaging optical system of Example 1 except that, in the second lens group G2, a first movable lens group is composed of two lenses L2$a$ and L2$b$ and a second movable lens group is composed of 6 lenses L2$c$ to L2$h$. Table 9 shows basic lens data of the imaging optical system of Example 3, Table 10 shows data about specification, Table 11 shows data about variable surface distances, Table 12 shows data about aspheric surface coefficients thereof, and FIG. 11 shows respective aberration diagrams.

TABLE 9

Example 3 Lens Data (n, ν at the d line)

| Surface Number | Radius of Curvature | Surface Distance | n | ν |
|---|---|---|---|---|
| *1 | −6.4992 | 1.1189 | 1.53158 | 55.08 |
| *2 | −80.6860 | 0.7184 | | |
| 3 | 9.6798 | 0.3596 | 1.77250 | 49.60 |
| 4 | 4.6597 | 1.0320 | | |
| 5 | 7.0230 | 0.2498 | 1.84666 | 23.78 |
| 6 | 3.6203 | 0.9385 | | |
| 7 | 6.2157 | 0.2198 | 1.77250 | 49.60 |
| 8 | 2.8299 | 3.3271 | | |
| 9 | −3.9797 | 1.3704 | 1.48749 | 70.44 |
| 10 | −14.4610 | 0.0864 | | |
| 11 | −9.6753 | 1.5042 | 1.51742 | 52.43 |
| 12 | −6.1983 | 0.5060 | | |
| 13 | 17.0509 | 0.4524 | 1.80518 | 25.45 |
| 14 | −77.0485 | 0.3472 | | |
| 15 | ∞ | 2.2863 | 1.77250 | 49.60 |
| 16 | −11.5596 | 4.7366 | | |
| The first reflector | ∞ | 3.7745 | | |
| 17 | 8.0765 | 2.4741 | 1.49700 | 81.54 |
| 18 | −6.3664 | 0.2597 | 1.84666 | 23.78 |
| 19 | −19.2198 | 0.0436 | | |
| 20 | ∞ | 0.2498 | 1.84666 | 23.78 |
| 21 | 5.7933 | 3.0712 | 1.49700 | 81.54 |
| 22 | −8.2588 | 0.6370 | | |
| *23 | −4.2540 | 0.6793 | 1.51007 | 56.24 |
| *24 | −3.9026 | 5.4671 | | |

TABLE 9-continued

Example 3 Lens Data (n, ν at the d line)

| Surface Number | Radius of Curvature | Surface Distance | n | ν |
|---|---|---|---|---|
| 25 | 13.9738 | 1.7250 | 1.80518 | 25.45 |
| 26 | −96.4104 | 10.8579 | | |
| The second reflector | ∞ | DD[26] | | |
| 27 | 9.4762 | 0.1998 | 1.84666 | 23.78 |
| 28 | 4.8980 | 1.7003 | 1.80610 | 33.27 |
| 29 | ∞ | DD[29] | | |
| 30 | 35.8629 | 0.1998 | 1.84666 | 23.78 |
| 31 | 5.0353 | 1.8454 | 1.48749 | 70.44 |
| 32 | −16.8042 | 0.1638 | | |
| 33 | 11.8313 | 0.4924 | 1.80518 | 25.45 |
| 34 | ∞ | 0.0000 | | |
| 35(Stop) | ∞ | 3.7897 | | |
| 36 | −3.9288 | 0.1998 | 1.77250 | 49.60 |
| 37 | 5.9500 | 1.5626 | 1.49700 | 81.54 |
| 38 | −5.9500 | 0.0800 | | |
| 39 | 19.5907 | 1.6550 | 1.49700 | 81.54 |
| 40 | −4.9591 | DD[40] | | |
| 41 | 28.6953 | 0.7469 | 1.84666 | 23.78 |
| 42 | −28.6953 | 2.5458 | | |
| 43 | ∞ | 5.2049 | 1.51633 | 64.14 |
| 44 | ∞ | | | |

TABLE 10

Example 3 Specification (d line)

| | Wide-angle end | Telephoto end |
|---|---|---|
| Zoom ratio | 1.00 | 1.10 |
| \|f\| | 1.00 | 1.10 |
| Bf | 5.97 | 5.97 |
| FNo. | 2.40 | 2.49 |
| 2ω[°] | 136.8 | 133.2 |

TABLE 11

Example 3 Variable Surface Distance

| | Wide-angle end | Telephoto end |
|---|---|---|
| DD[26] | 8.6773 | 7.3160 |
| DD[29] | 3.1043 | 3.5351 |
| DD[40] | 0.4055 | 1.3360 |

TABLE 12

Example 3 Aspheric Surface Coefficient

| Surface Number | 1 | 2 | 23 | 24 |
|---|---|---|---|---|
| KA | −7.61482686E−01 | −3.48820069E−02 | −1.01012276E+00 | −1.40818506E+00 |
| A3 | 4.51236196E−02 | 5.29493625E−02 | 0.00000000E+00 | 0.00000000E+00 |
| A4 | −1.26832345E−02 | −2.37174957E−02 | 5.56563185E−03 | 4.29582309E−03 |
| A5 | 1.18649237E−03 | 6.16545515E−03 | −1.65861101E−03 | −4.31415588E−04 |
| A6 | 1.02575200E−03 | −3.50714107E−04 | 2.60607923E−03 | 2.36523159E−04 |
| A7 | −4.79061453E−04 | −1.96325530E−04 | −1.63344667E−03 | 4.00351000E−04 |
| A8 | 5.43139003E−05 | 5.35497728E−06 | 9.36743510E−05 | −3.56136045E−04 |
| A9 | 1.68123648E−05 | 2.42704660E−05 | 2.48664590E−04 | 1.31786922E−06 |
| A10 | −5.47284336E−06 | −5.52289167E−06 | −8.09740850E−05 | 6.22012977E−05 |
| A11 | 1.04638970E−07 | −4.28367780E−07 | −7.32412644E−06 | −1.18625104E−05 |
| A12 | 1.61246044E−07 | 2.82413489E−07 | 8.90299508E−06 | −3.73526892E−06 |
| A13 | −1.79799994E−08 | −1.49899687E−08 | −1.14608865E−06 | 1.27405227E−06 |
| A14 | −1.89259270E−09 | −5.75522421E−09 | −3.59823820E−07 | 5.91018853E−08 |
| A15 | 4.20390648E−10 | 6.94734821E−10 | 1.05132658E−07 | −5.70456948E−08 |
| A16 | 7.54048375E−13 | 4.37519396E−11 | 2.20234253E−09 | 2.58032203E−09 |
| A17 | −4.17610873E−12 | −1.02641668E−11 | −3.28323187E−09 | 1.20000939E−09 |

TABLE 12-continued

Example 3 Aspheric Surface Coefficient

| Surface Number | 1 | 2 | 23 | 24 |
|---|---|---|---|---|
| A18 | 1.61892939E-13 | 1.33001883E-13 | 1.96286547E-10 | -1.13308152E-10 |
| A19 | 1.56801092E-14 | 5.29763279E-14 | 3.61083968E-11 | -9.79537045E-12 |
| A20 | -9.58584130E-16 | -2.50709553E-15 | -3.55947028E-12 | 1.25650796E-12 |

EXAMPLE 4

Figure 7:
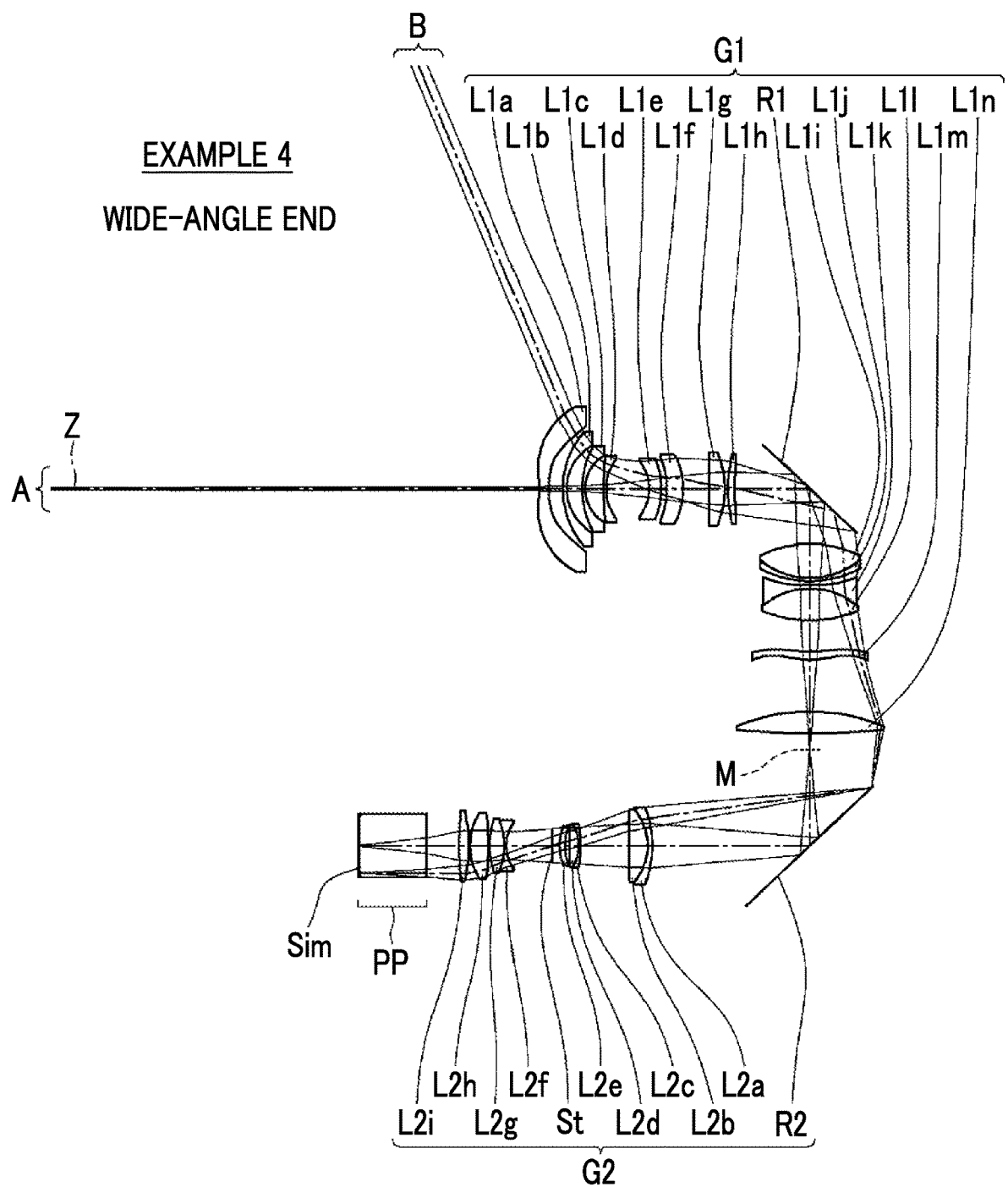
FIG. 7 is a cross-sectional view illustrating a lens configuration of an imaging optical system of Example 4 of the present invention.
Figure 8:
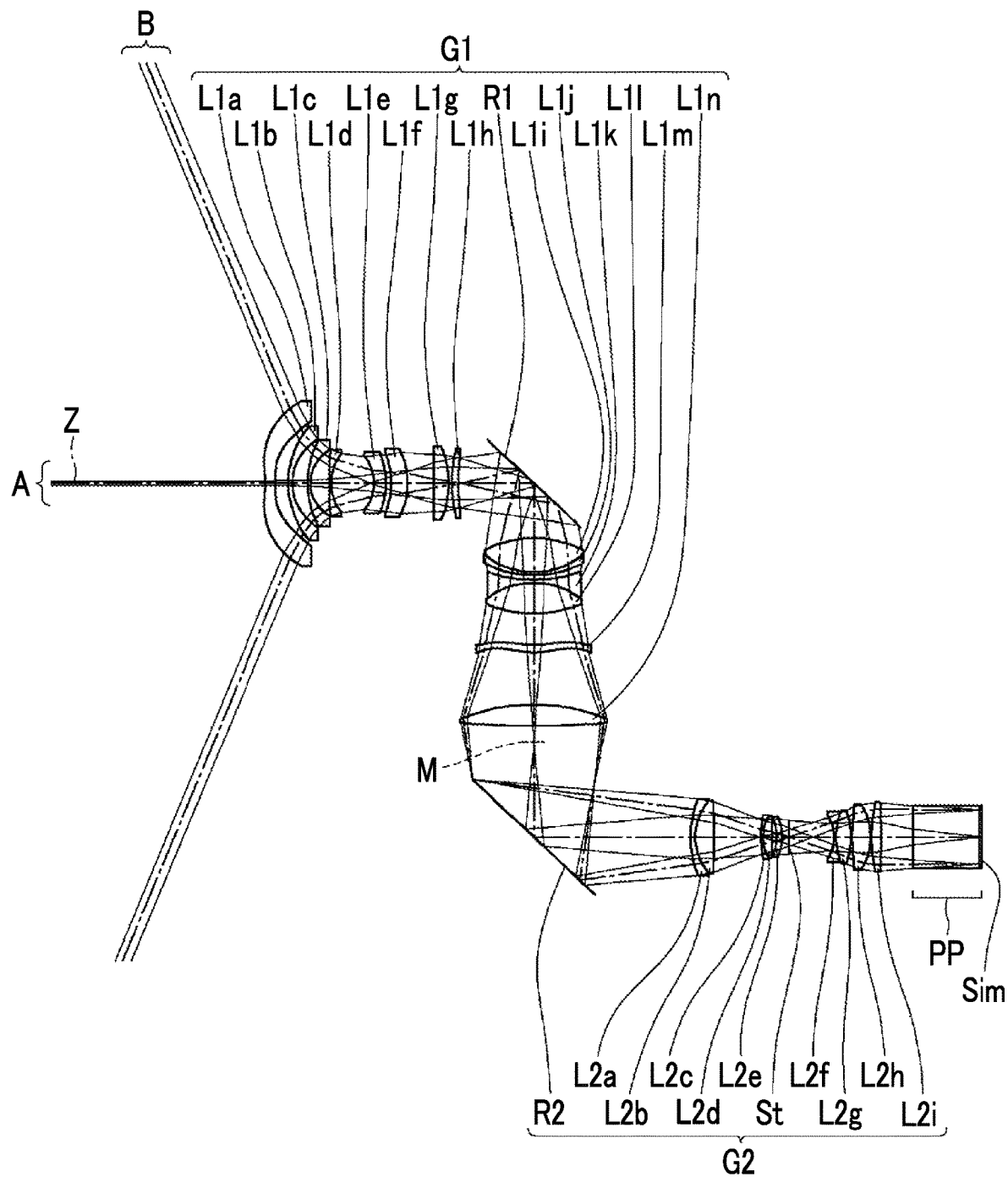
FIG. 8 is a cross-sectional view illustrating a lens configuration of a modification example of the imaging optical system of Example 4 of the present invention.

Next, an imaging optical system of Example 4 will be described. FIG. 4 is a cross-sectional view illustrating a configuration of an imaging optical system of Example 4, and FIG. 7 is a cross-sectional view illustrating a modification example of the imaging optical system of Example 8. The imaging optical system of Example 4 has the same configuration as the imaging optical system of Example 1 except that, in the second lens group G2, a first movable lens group is composed of two lenses L2a and L2b, a second movable lens group is composed of three lenses L2c to L2e, and a third movable lens group is composed of three lenses L2f to L2h. Table 13 shows basic lens data of the imaging optical system of Example 4, Table 14 shows data about specification, Table 15 shows data about variable surface distances, Table 16 shows data about aspheric surface coefficients thereof, and FIG. 12 shows respective aberration diagrams.

TABLE 13

Example 4 Lens Data (n, ν at the d line)

| Surface Number | Radius of Curvature | Surface distance | n | ν |
|---|---|---|---|---|
| *1 | -6.2359 | 0.8486 | 1.53158 | 55.08 |
| *2 | -28.2241 | 1.1732 | | |
| 3 | 8.6363 | 0.3519 | 1.89190 | 37.13 |
| 4 | 4.8875 | 1.3519 | | |
| 5 | 8.7563 | 0.2542 | 1.84666 | 23.78 |
| 6 | 3.7666 | 1.6261 | | |
| 7 | 27.1732 | 0.2150 | 1.62041 | 60.29 |
| 8 | 4.8844 | 3.7608 | | |
| 9 | -4.3942 | 1.0672 | 1.48749 | 70.44 |
| 10 | -7.7489 | 0.4679 | | |
| 11 | -8.2994 | 1.4574 | 1.77250 | 49.60 |
| 12 | -7.2011 | 2.2771 | | |
| 13 | 446.1962 | 1.3573 | 1.53996 | 59.46 |
| 14 | -9.3869 | 0.2900 | | |
| 15 | 14.9691 | 0.5872 | 1.84666 | 23.78 |
| 16 | 32.7596 | 6.6295 | | |
| The first reflector | ∞ | 5.1313 | | |
| 17 | 9.1455 | 3.1607 | 1.49700 | 81.61 |
| 18 | -6.4930 | 0.2757 | 1.84666 | 23.78 |
| 19 | -8.9219 | 0.4432 | | |
| 20 | -11.2173 | 0.2737 | 1.84666 | 23.78 |
| 21 | 6.4125 | 2.8660 | 1.49700 | 81.61 |
| 22 | -10.2691 | 2.9067 | | |
| *23 | -12.6928 | 0.7289 | 1.51007 | 56.24 |
| *24 | -7.4063 | 4.8880 | | |
| 25 | 15.7427 | 2.0255 | 1.77250 | 49.60 |
| 26 | -63.6096 | 10.4431 | | |
| The second reflector | ∞ | DD[26] | | |
| 27 | 10.2332 | 0.4204 | 1.84666 | 23.78 |
| 28 | 5.5256 | 1.6492 | 1.74950 | 35.28 |
| 29 | -62.6221 | DD[29] | | |
| 30 | 10.5774 | 0.1955 | 1.84666 | 23.78 |
| 31 | 4.1526 | 0.7980 | 1.51823 | 58.90 |
| 32 | -67.8958 | 0.4102 | | |
| 33 | -4.8371 | 0.4580 | 1.58913 | 61.13 |
| 34 | -4.9465 | DD[34] | | |
| 35(Stop) | ∞ | 3.9364 | | |
| 36 | -4.0669 | 0.1975 | 1.62041 | 60.29 |
| 37 | 6.7511 | 1.3081 | 1.49700 | 81.61 |
| 38 | -7.6316 | 0.1490 | | |
| 39 | 26.1405 | 1.6069 | 1.49700 | 81.61 |
| 40 | -5.8720 | DD[40] | | |
| 41 | 14.9937 | 0.8491 | 1.84666 | 23.78 |
| 42 | -43.6490 | 2.8269 | | |
| 43 | ∞ | 5.8658 | 1.74320 | 49.34 |
| 44 | ∞ | 0.2053 | 1.51633 | 64.14 |
| 45 | ∞ | | | |

TABLE 14

Example 4 Specification (d line)

| | Wide-angle end | Telephoto end |
|---|---|---|
| Zoom ratio | 1.00 | 1.10 |
| \|f\| | 1.00 | 1.10 |
| Bf | 6.32 | 6.32 |
| FNo. | 2.40 | 2.51 |
| 2ω[°] | 137.0 | 133.4 |

TABLE 15

Example 4 Variable Surface Distance

| | Wide-angle end | Telephoto end |
|---|---|---|
| DD[26] | 13.8495 | 12.3362 |
| DD[29] | 4.1887 | 4.8168 |
| DD[34] | 0.6458 | 0.3625 |
| DD[40] | 0.0724 | 1.2409 |

TABLE 16

Example 4 Aspheric Surface Coefficient

|  | 1 | 2 | 23 | 24 |
|---|---|---|---|---|
| KA | −5.96892783E−01 | −1.95896304E+00 | −4.76816872E+00 | 4.30022869E−01 |
| A3 | 2.94096605E−02 | 3.94646509E−02 | −2.82131063E−17 | −3.12244935E−17 |
| A4 | 2.54314952E−03 | −9.89086482E−03 | 1.74094669E−03 | 4.46947708E−03 |
| A5 | −2.99093675E−03 | 4.09481963E−03 | −3.58482466E−03 | −4.73744684E−03 |
| A6 | 6.90203693E−04 | −1.21561661E−03 | 3.81306340E−03 | 2.94648417E−03 |
| A7 | −2.75622057E−06 | 1.94759505E−04 | −5.82333466E−04 | 6.33671754E−04 |
| A8 | −3.03379197E−05 | −8.62176632E−06 | −6.11459156E−04 | −8.98804578E−04 |
| A9 | 4.32859625E−06 | −2.57358698E−06 | 1.53749482E−04 | 2.41996323E−05 |
| A10 | 4.93579158E−07 | 3.61666513E−07 | 7.82158145E−05 | 1.40479541E−04 |
| A11 | −1.57177494E−07 | 1.52636607E−08 | −2.76661632E−05 | −2.38947838E−05 |
| A12 | 6.01711640E−10 | −3.83523428E−09 | −4.15138861E−06 | −9.73823293E−06 |
| A13 | 2.67116714E−09 | −3.12298347E−10 | 2.34864643E−06 | 2.74866904E−06 |
| A14 | −1.29189951E−10 | 5.22161852E−11 | 2.36691118E−08 | 2.62258605E−07 |
| A15 | −2.47313806E−11 | 1.69771022E−12 | −9.84899610E−08 | −1.35268198E−07 |
| A16 | 1.83026221E−12 | −1.67572897E−13 | 5.39474271E−09 | 1.34869421E−09 |
| A17 | 1.21478425E−13 | −3.75983735E−14 | 2.02156259E−09 | 3.10562024E−09 |
| A18 | −1.11469981E−14 | 3.16409257E−15 | −1.83699968E−10 | −1.89593945E−10 |
| A19 | −2.50421544E−16 | −2.55888051E−17 | −1.63045515E−11 | −2.73373080E−11 |
| A20 | 2.62384910E−17 | −2.14529058E−18 | 1.85130929E−12 | 2.47453151E−12 |

Table 17 shows values corresponding to symbols included in Conditional Expressions (1) to (6) of the imaging optical system of Examples 1 to 4, and Table 18 shows values corresponding to Conditional Expressions (1) to (6) of the imaging optical system of Examples 1 to 4. It should be noted that, in the above-mentioned examples, the d line is set as the reference wavelength, and the values shown in Tables 17 and 18 are values at the reference wavelength.

TABLE 17

| Symbols | Example 1 | Example 2 | Example 3 | Example 4 |
|---|---|---|---|---|
| |fw| | 1.000 | 1.000 | 1.000 | 1.000 |
| Dr | 0.415 | 0.182 | 0.236 | −0.023 |
| Tr | −1.022 | −1.055 | −1.042 | −0.788 |
| Sr | −0.669 | −0.673 | −0.664 | −0.539 |
| Imax | 2.600 | 2.597 | 2.597 | 2.542 |
| Hzmax | 2.283 | 2.275 | 2.387 | 2.553 |
| fr | 13.830 | 13.322 | 14.157 | 15.848 |
| La | 19.680 | 18.804 | 19.254 | 23.715 |
| Lb | 29.002 | 28.915 | 29.239 | 33.143 |
| Lc | 24.784 | 24.395 | 24.823 | 30.735 |

TABLE 18

| Expression Number | Conditional Expressions | Example 1 | Example 2 | Example 3 | Example 4 |
|---|---|---|---|---|---|
| (1) | Dr | 0.415 | 0.182 | 0.236 | −0.023 |
| (2) | (Tr + Sr)/|fw| | −1.691 | −1.728 | −1.706 | −1.327 |
| (3) | fr/|fw| | 13.830 | 13.322 | 14.157 | 15.848 |
| (4) | Hzmax/Imax | 0.878 | 0.876 | 0.919 | 1.004 |
| (5) | Lc/La | 1.259 | 1.297 | 1.289 | 1.296 |
| (6) | Lb/La | 1.474 | 1.538 | 1.519 | 1.398 |

As can be seen from the above data, since all the imaging optical systems of Examples 1 to 4 satisfy Conditional Expressions (1) to (6), each imaging optical system has a high optical performance, in which various aberrations are favorably corrected, while having a small size and providing a wide angle of view as a total angle of 120° or more.

Figure 13:
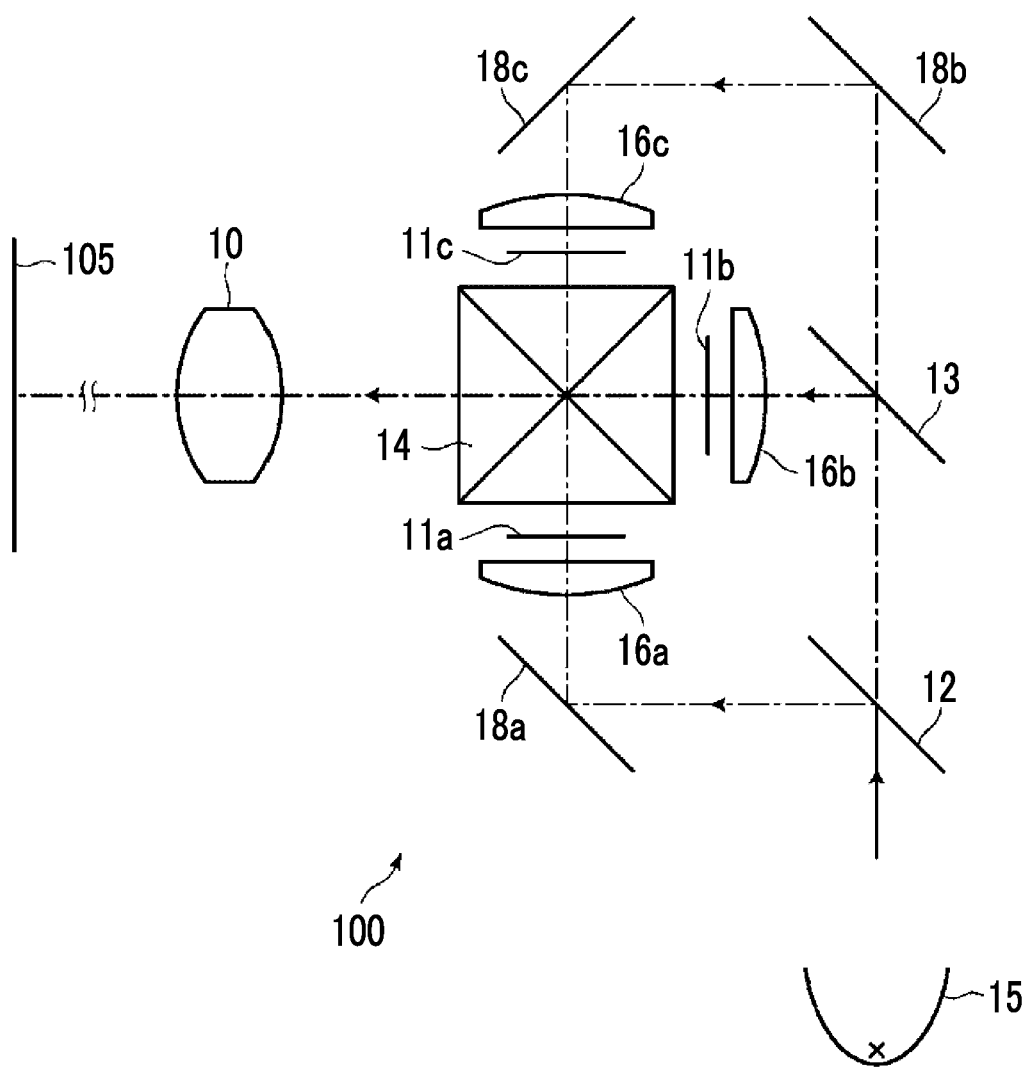
FIG. 13 is a schematic configuration diagram of a projection display device according to an embodiment of the present invention.

Next, a projection display device according to an embodiment of the present invention will be described. FIG. 13 is a schematic configuration diagram of the projection display device according to the above-mentioned embodiment of the present invention. The projection display device 100 shown in FIG. 13 has an imaging optical system 10 according to the above-mentioned embodiment of the present invention, a light source 15, transmissive display elements 11a to 11c as light valves corresponding to respective color light rays, dichroic mirrors 12 and 13 for color separation, a cross dichroic prism 14 for color synthesis, condenser lenses 16a to 16c, and total reflection mirrors 18a to 18c for deflecting the optical axis. In FIG. 13, the imaging optical system 10 is schematically shown. Further, an integrator is disposed between the light source 15 and the dichroic mirror 12 but not shown in FIG. 13.

White light originating from the light source 15 is separated into rays with three colors (G light, B light, R light) through the dichroic mirrors 12 and 13. Thereafter, the rays respectively pass through the condenser lenses 16a to 16c, are incident into and modulated through the transmissive display elements 11a to 11c respectively corresponding to the rays with the respective colors, are subjected to color synthesis through the cross dichroic prism 14, and are subsequently incident into the imaging optical system 10. The imaging optical system 10 projects an optical image, which is formed by the light optically modulated through the transmissive display elements 11a to 11c, onto a screen 105.

Figure 14:
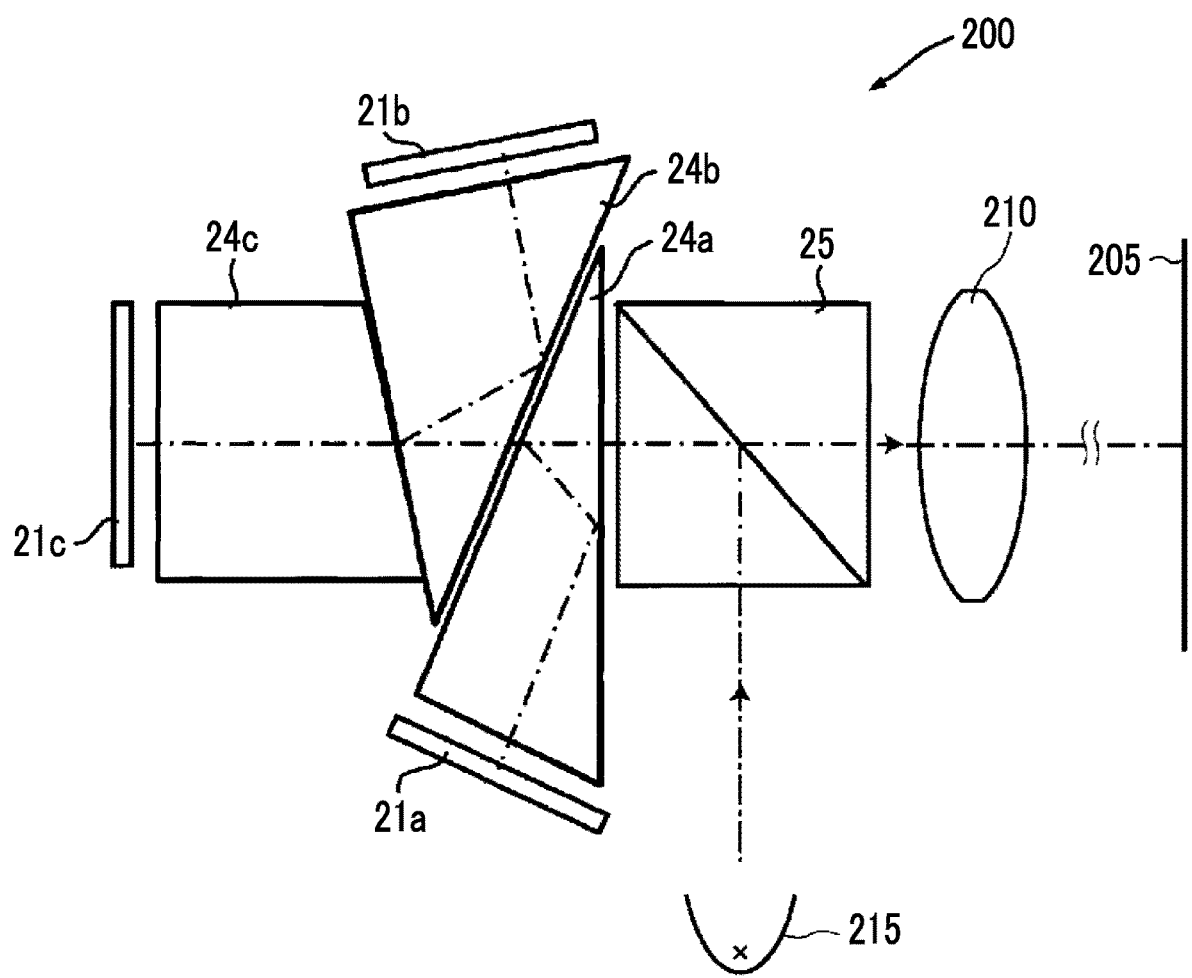
FIG. 14 is a schematic configuration diagram of a projection display device according to another embodiment of the present invention.

FIG. 14 is a schematic configuration diagram of a projection display device according to another embodiment of the present invention. The projection display device 200 shown in FIG. 14 has an imaging optical system 210 according to the above-mentioned embodiment of the present invention, a light source 215, DMD elements 21a to 21c as light valves corresponding to respective color light rays, total internal reflection (TIR) prisms 24a to 24c for color separation and color synthesis, and a polarization separating prism 25 that separates illumination light and projection light. In FIG. 14, the imaging optical system 210 is schematically illustrated. Further, an integrator is disposed between the light source 215 and the polarization separating prism 25, but illustration thereof is omitted in FIG. 14.

White light originated from the light source 215 is reflected on a reflective surface inside the polarization separating prism 25 and is separated into rays with three colors (G light, B light, R light) through the TIR prisms 24a to 24c. The separated rays with the respective colors are respectively incident into and optically modulated through the corresponding DMD elements 21a to 21c, travel through the TIR prisms 24a to 24c again in a reverse direction, are subjected to color synthesis, are subsequently transmitted through the polarization separating prism 25, and are incident into the imaging optical system 210. The imaging optical system 210 projects an optical image, which is formed by the light optically modulated through the DMD elements 21a to 21c, onto a screen 205.

Figure 15:
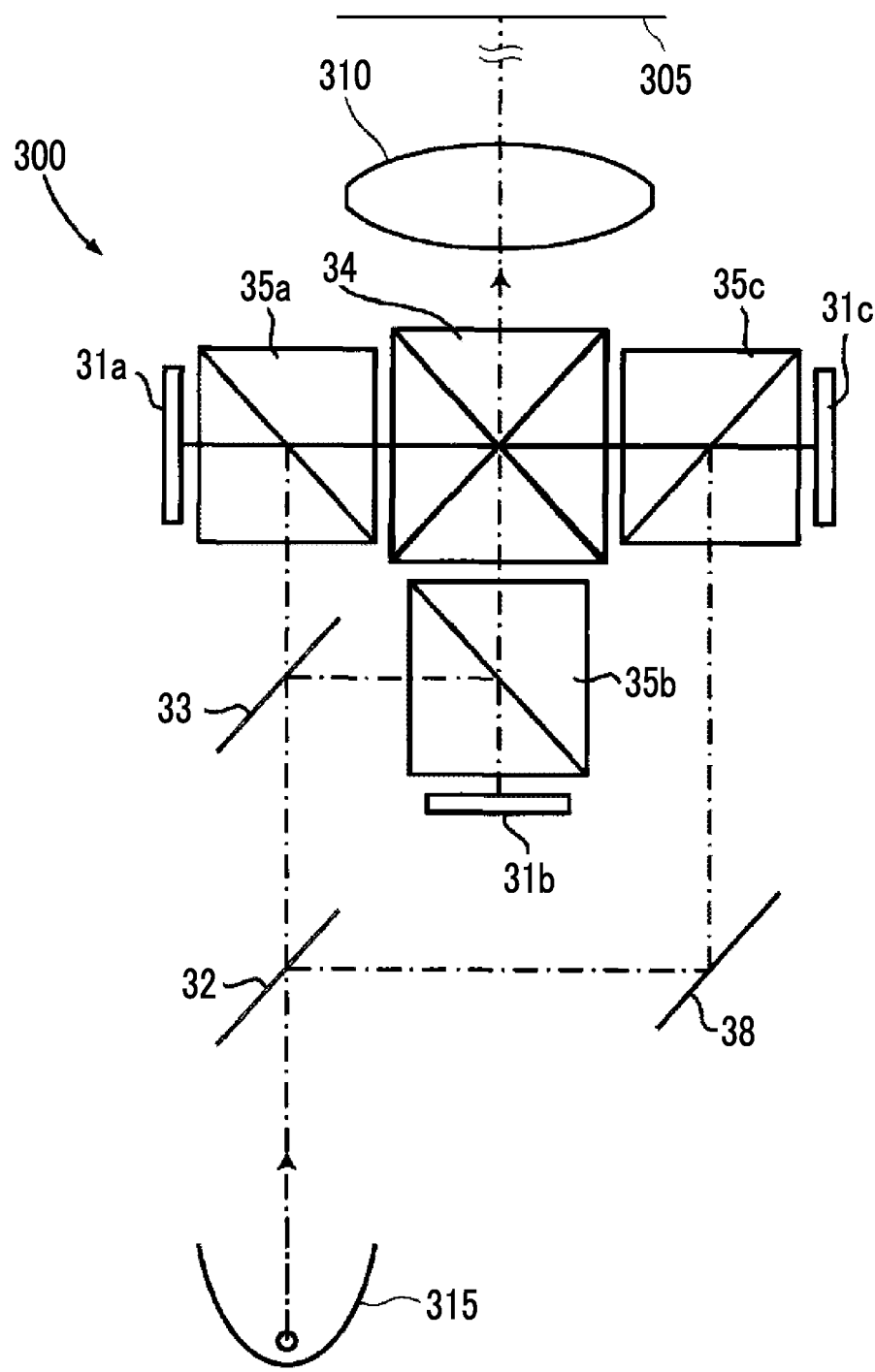
FIG. 15 is a schematic configuration diagram of a projection display device according to still another embodiment of the present invention.

FIG. 15 is a schematic configuration diagram of a projection display device according to still another embodiment of the present invention. The projection display device 300 shown in FIG. 15 has an imaging optical system 310 according to the above-mentioned embodiment of the present invention, a light source 315, reflective display elements 31a to 31c as light valves corresponding to respective color light rays, dichroic mirrors 32 and 33 for color separation, a cross dichroic prism 34 for color synthesis, a total reflection mirror 38 for deflecting the optical axis, and polarization separating prisms 35a to 35c. In FIG. 15, the imaging optical system 310 is schematically illustrated. Further, an integrator is disposed between the light source 315 and the dichroic mirror 32 but not shown in FIG. 15.

White light originated from the light source 315 is separated into rays with three colors (G light, B light, R light) through the dichroic mirrors 32 and 33. The separated rays with the respective colors respectively pass through the polarization separating prisms 35a to 35c, are incident into and optically modulated through the reflective display elements 31a to 31c respectively corresponding to the rays with the respective colors, are subjected to color synthesis through the cross dichroic prism 34, and are subsequently incident into the imaging optical system 310. The imaging optical system 310 projects an optical image, which is formed by the light optically modulated through the reflective display elements 31a to 31c, onto a screen 305.

Figure 16:
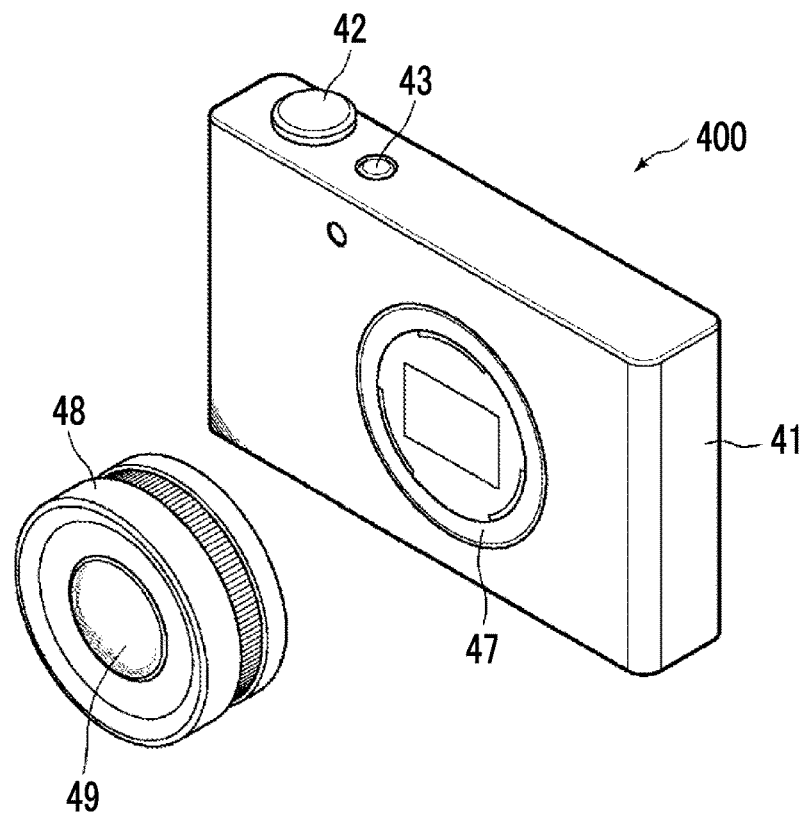
FIG. 16 is a perspective view of a front side of an imaging apparatus according to an embodiment of the present invention.
Figure 17:
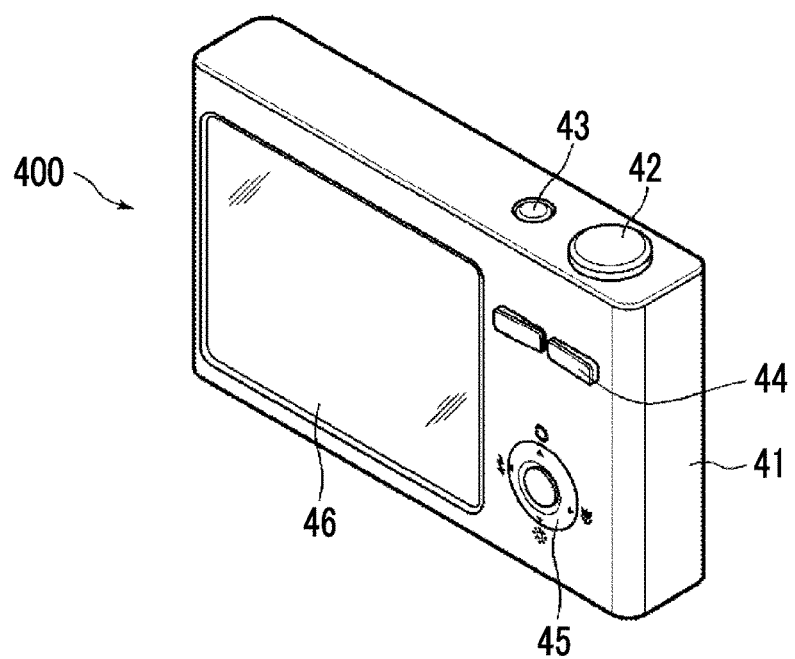
FIG. 17 is a perspective view of a rear side of the imaging apparatus shown in FIG. 16.

FIGS. 16 and 17 are external views of a camera 400 which is the imaging apparatus according to the above-mentioned embodiment of the present invention. FIG. 16 is a perspective view of the camera 400 viewed from the front side, and FIG. 17 is a perspective view of the camera 400 viewed from the rear side. The camera 400 is a single-lens digital camera on which an interchangeable lens 48 is detachably mounted and which has no reflex finder. The interchangeable lens 48 is configured such that an imaging optical system 49 as the optical system according to the above-mentioned embodiment of the present invention is housed in a lens barrel.

The camera 400 comprises a camera body 41, and a shutter button 42 and a power button 43 are provided on an upper surface of the camera body 41. Further, operation sections 44 and 45 and a display section 46 are provided on a rear surface of the camera body 41. The display section 46 is for displaying a captured image and/or an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, an imaging device (not shown) such as a charge coupled device (CCD) or a complementary metal oxide semiconductor (CMOS) that outputs an imaging signal according to the subject image formed by the interchangeable lens 48 and a signal processing circuit that processes an imaging signal output from the element to generate an image, a recording medium for recording the generated image, and the like are provided. The camera 400 is able to capture a still image or a moving image by pressing the shutter button 42, and is able to store image data, which is obtained through imaging, in the storage medium.

The present invention has been hitherto described through embodiments and examples, but the imaging optical system of the present invention is not limited to the above-mentioned embodiments and examples, and may be modified into various forms. For example, the radius of curvature, the surface spacing, the refractive index, and the Abbe number of each lens may be appropriately changed.

Further, the projection display device of the present invention is not limited to that of the above-mentioned configuration. For example, the used light valve and the optical member used in separation or synthesis of rays are not limited to those of the above-mentioned configuration, and may be modified into various forms. The light valve is not limited to a configuration in which light from a light source is spatially modulated by an image display element and output as an optical image based on image data, and may be configured to output light itself, which is output from a self-luminous image display element, as an optical image based on image data. Examples of the self-luminous image display element include an image display element in which light-emitting elements such as light emitting diodes (LED) or organic light emitting diodes (OLED) are two-dimensionally arranged.

Further, the imaging apparatus of the present invention is also not limited to the above-mentioned configurations. For example, the present invention may be applied to a single-lens reflex camera, a film camera, a video camera, and the like.

EXPLANATION OF REFERENCES 10, 210, 310: imaging optical system
11a to 11c: transmissive display element
12, 13, 32, 33: dichroic mirror
14, 34: cross dichroic prism
15, 215, 315: light source
16a to 16c: condenser lens
18a to 18c, 38: total reflection mirror
21a to 21c: DMD element
24a to 24c: TIR prism
25, 35a to 35c: polarization separating prism
31a to 31c: reflective display element
41: camera body
42: shutter button
43: power button
44, 45: operation section
46: display section
47: mount
48: interchangeable lens
49: imaging optical system
100, 200, 300: projection display device
105, 205, 305: screen
400: camera
A: rays with minimum angle of view
B: rays with maximum angle of view
G1: first lens group
G2: second lens group
L1a to L2i: lens
M: intermediate image
PP: optical member
R1: first reflector
R2: second reflector Sim: image display surface
St: aperture stop
Z: optical axis

What is claimed is:

1. An imaging optical system consisting of, in order from a magnification side along an optical axis:
   a first lens group; and
   a second lens group, wherein
   an intermediate image is formed between the first lens group and the second lens group on the optical axis,
   at least one of the first lens group or the second lens group comprises a reflector that bends the optical axis,
   the second lens group comprises a movable lens group that moves during zooming, and
   assuming that distortion of a maximum image height on a reduction side of the second lens group at a wide-angle end is Dr, a difference in an optical axis direction between a paraxial image plane of the maximum image height and a tangential image plane on a reduction side of the second lens group at the wide-angle end is Tr, a difference in the optical axis direction between the paraxial image plane of the maximum image height and a sagittal image plane on the reduction side of the second lens group at the wide-angle end is Sr, and a focal length of the entire system at the wide-angle end is fw, the following Conditional Expressions (1) and (2) are satisfied $$-1<Dr<1 \quad (1)$$

$$-5<(Tr+Sr)/|fw|<-0.5 \quad (2).$$

2. The imaging optical system according to claim 1, wherein, assuming that a focal length of the second lens group at the wide-angle end is fr, Conditional Expression (3) is satisfied $$5<fr/|fw|<100 \quad (3).$$

3. The imaging optical system according to claim 1, wherein, assuming that a maximum value of heights of a principal ray in lens surfaces in the movable lens group at the wide-angle end is Hz max and the maximum image height on the reduction side of the entire system is I max, Conditional Expression (4) is satisfied $$Hz\max/I\max<1.5 \quad (4).$$

4. The imaging optical system according to claim 1, wherein the reflector comprises, in order from the magnification side along the optical axis, a first reflector that bends the optical axis by 90° and a second reflector that bends the optical axis by 90°.

5. The imaging optical system according to claim 4, wherein, assuming that a distance on the optical axis from a lens surface closest to the magnification side to the first reflector is La, a distance on the optical axis from the first reflector to the second reflector is Lb, and a distance on the optical axis from the second reflector to a lens surface closest to the reduction side is Lc, Conditional Expressions (5) and (6) are satisfied $$1<Lc/La<2 \quad (5)$$

$$1.2<Lb/La<2.5 \quad (6).$$

6. The imaging optical system according to claim 1, wherein the reduction side is telecentric.

7. The imaging optical system according to claim 1, wherein Conditional Expression (1-1) is satisfied $$-0.5<Dr<0.5 \quad (1-1).$$

8. The imaging optical system according to claim 1, wherein Conditional Expression (2-1) is satisfied $$-3<(Tr+Sr)/|fw|<-1 \quad (2-1).$$

9. The imaging optical system according to claim 2, wherein Conditional Expression (3-1) is satisfied $$10<fr/|fw|<30 \quad (3-1).$$

10. The imaging optical system according to claim 3, wherein Conditional Expression (4-1) is satisfied $$0<Hz\max/I\max<1 \quad (4-1).$$

11. A projection display device comprising:
    a light valve that outputs an optical image based on image data; and
    the imaging optical system according to claim 1,
    wherein the imaging optical system projects the optical image, which is output from the light valve, on a screen.

12. An imaging apparatus comprising the imaging optical system according to claim 1.

* * * * *